US012657889B2

(12) United States Patent
Zhang et al.

(10) Patent No.: US 12,657,889 B2
(45) Date of Patent: Jun. 16, 2026

(54) FEATURE EXTRACTION MODEL PROCESSING

(71) Applicant: Tencent Technology (Shenzhen) Company Limited, Shenzhen (CN)

(72) Inventors: Binjie Zhang, Shenzhen (CN); Yixiao Ge, Shenzhen (CN); Shupeng Su, Shenzhen (CN); Xuyuan Xu, Shenzhen (CN); Yexin Wang, Shenzhen (CN); Ying Shan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 290 days.

(21) Appl. No.: 18/592,346

(22) Filed: Feb. 29, 2024

(65) Prior Publication Data

US 2024/0203106 A1 Jun. 20, 2024

Related U.S. Application Data

(63) Continuation of application No. PCT/CN2023/120674, filed on Sep. 22, 2023.

(30) Foreign Application Priority Data

Oct. 11, 2022 (CN) .......................... 202211242030.4

(51) Int. Cl.
*G06V 10/00* (2022.01)
*G06V 10/40* (2022.01)
(Continued)

(52) U.S. Cl.
CPC ............ *G06V 10/776* (2022.01); *G06V 10/40* (2022.01); *G06V 10/764* (2022.01); *G06V 10/774* (2022.01)

(58) Field of Classification Search
CPC .... G06V 10/776; G06V 10/40; G06V 10/764; G06V 10/774; G06V 10/82; G06F 18/00; Y02T 10/40
See application file for complete search history.

(56) References Cited

U.S. PATENT DOCUMENTS 11,216,697 B1 * 1/2022 Shen ........................ G06F 16/55

OTHER PUBLICATIONS

Meng et al, Learning Compatible Embeddings, 2021 IEEE/CVF International Conference on Computer Vision (ICCV) (Year: 2021).*
(Continued)

*Primary Examiner* — Jennifer Mehmood
*Assistant Examiner* — Xiao Liu
(74) *Attorney, Agent, or Firm* — ARENTFOX SCHIFF LLP

(57) ABSTRACT

In a feature extraction model processing method, a sample image and an inheritance parameter of the sample image are obtained. The inheritance parameter is based on feature distinctiveness of a first image feature of the sample image. The first image feature is extracted from the sample image. A second image feature extracted from the sample image is obtained. A classification result of a first classification that is based on the second image feature is obtained. A classification loss of the first classification is adjusted based on the inheritance parameter to obtain a model compatibility loss. A classification loss of a second classification is determined. Respective model parameters of a feature extraction model to be trained and a image classification model to be trained are updated based on the model compatibility loss and the classification loss of the second classification.

20 Claims, 7 Drawing Sheets

(51) Int. Cl.
    *G06V 10/764*     (2022.01)
    *G06V 10/774*     (2022.01)
    *G06V 10/776*     (2022.01)

(56)              References Cited

OTHER PUBLICATIONS

Huang et al, Revisiting Knowledge Distillation: An Inheritance and Exploration Framewor,2021 IEEE/CVF Conference on Computer Vision and Pattern Recognition (CVPR) (Year: 2021).*
International Search Report issued Dec. 21, 2023 in Application No. PCT/CN2023/120674 (9 pages).
Zhang, Binjie, et al. "Darwinian model upgrades: Model evolving with selective compatibility." Proceedings of the AAAI Conference on Artificial Intelligence. vol. 37. No. 3. 2023, pp. 1-10.
Shen, Yantao, et al. "Towards backward-compatible representation learning." Proceedings of the IEEE/CVF Conference on Computer Vision and Pattern Recognition. 2020, pp. 1-13.

\* cited by examiner

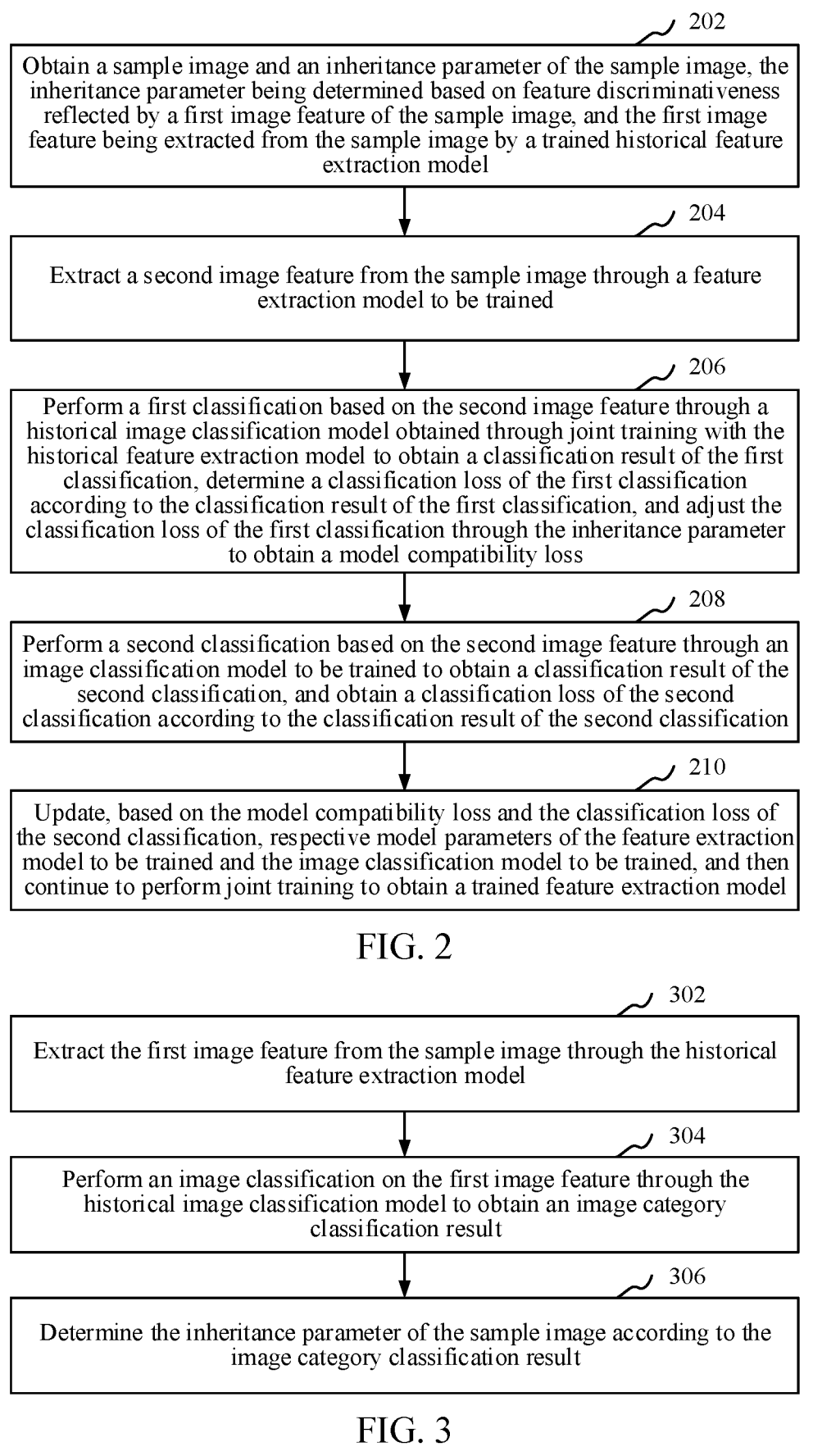

202

Obtain a sample image and an inheritance parameter of the sample image, the inheritance parameter being determined based on feature discriminativeness reflected by a first image feature of the sample image, and the first image feature being extracted from the sample image by a trained historical feature extraction model

204

Extract a second image feature from the sample image through a feature extraction model to be trained

206

Perform a first classification based on the second image feature through a historical image classification model obtained through joint training with the historical feature extraction model to obtain a classification result of the first classification, determine a classification loss of the first classification according to the classification result of the first classification, and adjust the classification loss of the first classification through the inheritance parameter to obtain a model compatibility loss

208

Perform a second classification based on the second image feature through an image classification model to be trained to obtain a classification result of the second classification, and obtain a classification loss of the second classification according to the classification result of the second classification

210

Update, based on the model compatibility loss and the classification loss of the second classification, respective model parameters of the feature extraction model to be trained and the image classification model to be trained, and then continue to perform joint training to obtain a trained feature extraction model

Extract the first image feature from the sample image through the historical feature extraction model

304

Perform an image classification on the first image feature through the historical image classification model to obtain an image category classification result

306

Determine the inheritance parameter of the sample image according to the image category classification result

FIG. 3

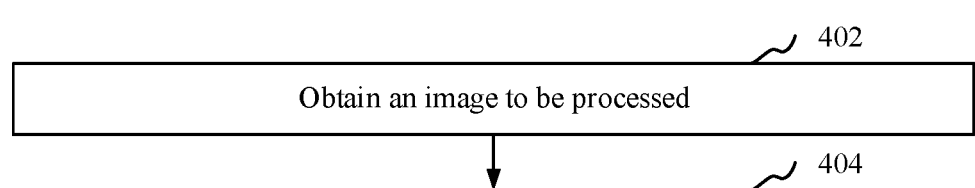

402

Obtain an image to be processed

404

Perform, through a feature extraction model, feature extraction on the image to be processed to obtain a to-be-processed-image feature of the image to be processed; the feature extraction model being obtained by continuing to perform joint training after updating, based on a model compatibility loss and a classification loss of a second classification, respective model parameters of a feature extraction model to be trained and an image classification model to be trained; the model compatibility loss being obtained by performing a first classification based on a second image feature through a historical image classification model and adjusting a classification loss of the first classification through an inheritance parameter, the historical image classification model being obtained through joint training with a trained historical feature extraction model; the second image feature being extracted from a sample image through the feature extraction model to be trained; the inheritance parameter being determined based on feature discriminativeness reflected by a first image feature of the sample image; the first image feature being extracted from the sample image by the historical feature extraction model; and the classification loss of the second classification being obtained by performing the second classification based on the second image feature through the image classification model to be trained

FIG. 4

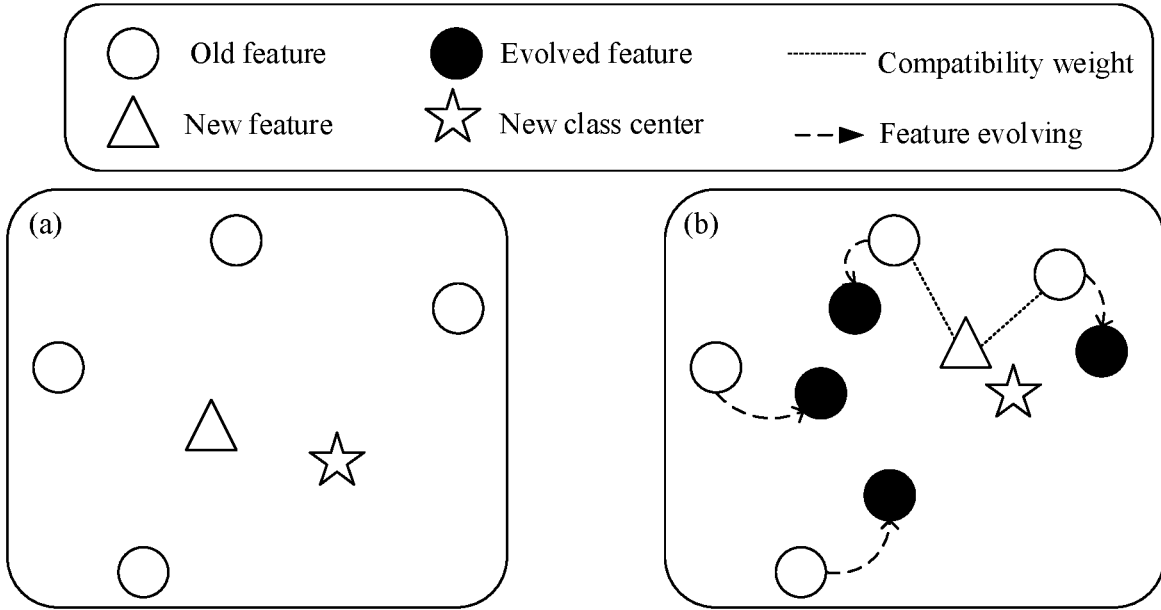

FIG. 5

FEATURE EXTRACTION MODEL PROCESSING

RELATED APPLICATIONS

The present application is a continuation of PCT/CN2023/120674, filed on Sep. 22, 2023, which claims priority to Chinese Patent Application No. 202211242030.4, entitled "FEATURE EXTRACTION MODEL PROCESSING METHOD AND APPARATUS, FEATURE EXTRACTION METHOD AND APPARATUS, AND COMPUTER DEVICE" filed on Oct. 11, 2022. The entire disclosures of the prior applications are hereby incorporated by reference.

FIELD OF THE TECHNOLOGY

This disclosure relates to the field of computer technologies, including to a feature extraction model processing method and apparatus, a computer device, a storage medium, and a computer program product, as well as a feature extraction method and apparatus, a computer device, a storage medium, and a computer program product.

BACKGROUND OF THE DISCLOSURE

With the development of computer technologies, the retrieval technology for retrieving specified resources from the Internet is no longer limited to text search, but further supports users in picture search. For example, a user can enter a query picture for retrieval, so that pictures similar to the query picture entered by the user can be found from a database. In the picture search technology, image features can be extracted from pictures. For example, image features are extracted through an image feature extraction model. Similarities are compared through the extracted image features to achieve retrieval processing for the pictures.

However, when the image feature extraction model is upgraded or updated, to achieve compatibility between the old model and the new model, the new model sacrifices part of its feature extraction capability. This can cause the new model to fail to extract effective image features.

SUMMARY

According to various embodiments provided in this disclosure, a feature extraction model processing method and apparatus, a computer device, a non-transitory computer-readable storage medium, and a computer program product, as well as a feature extraction method and apparatus, a computer device, a storage medium, and a computer program product are provided.

According to a first aspect, this disclosure provides a feature extraction model processing method. The method is performed by a computer device, for example. In the feature extraction model processing method, a sample image and an inheritance parameter of the sample image are obtained. The inheritance parameter is based on feature distinctiveness of a first image feature of the sample image. The first image feature is extracted from the sample image by a trained feature extraction model. A second image feature extracted from the sample image is obtained from a feature extraction model to be trained. A classification result of a first classification that is based on the second image feature is obtained from a trained image classification model. The trained image classification model is trained with the trained feature extraction model. A classification loss of the first classification is determined according to the classification result of the first classification. The classification loss of the first classification is adjusted based on the inheritance parameter to obtain a model compatibility loss. A second classification result of a second classification based on the second image feature is obtained from an image classification model to be trained. A classification loss of the second classification is determined according to the classification result of the second classification. Respective model parameters of the feature extraction model to be trained and the image classification model to be trained are updated based on the model compatibility loss and the classification loss of the second classification.

According to a second aspect, this disclosure further provides a feature extraction model processing apparatus, including processing circuitry. The processing circuitry is configured to obtain a sample image and an inheritance parameter of the sample image, the inheritance parameter being based on feature distinctiveness of a first image feature of the sample image, and the first image feature being extracted from the sample image by a trained feature extraction model. The processing circuitry is configured to obtain, from a feature extraction model to be trained, a second image feature extracted from the sample image. The processing circuitry is configured to obtain, from a trained image classification model, a classification result of a first classification that is based on the second image feature, the trained image classification model being trained with the trained feature extraction model. The processing circuitry is configured to determine a classification loss of the first classification according to the classification result of the first classification. The processing circuitry is configured to adjust the classification loss of the first classification based on the inheritance parameter to obtain a model compatibility loss. The processing circuitry is configured to obtain, from an image classification model to be trained, a second classification result of a second classification based on the second image feature. The processing circuitry is configured to determine a classification loss of the second classification according to the classification result of the second classification. The processing circuitry is configured to update, based on the model compatibility loss and the classification loss of the second classification, respective model parameters of the feature extraction model to be trained and the image classification model to be trained According to a third aspect, this disclosure further provides a computer device, including a memory and a processor, the memory storing computer-readable instructions, and the processor, when executing the computer-readable instructions, implementing the operations of the method embodiments of this disclosure.

According to a fourth aspect, this disclosure further provides a non-transitory computer-readable storage medium, storing instructions which when executed by a processor cause the processor to implement the operations of the method embodiments of this disclosure.

According to a fifth aspect, this disclosure further provides a computer program product, including computer-readable instructions, the computer-readable instructions, when executed by a processor, implementing the operations of the method embodiments of this disclosure.

According to a sixth aspect, this disclosure provides a feature extraction method. The method is performed by a computer device, for example. In the method, an image to be processed is obtained. Feature extraction is performed, via a feature extraction model, on the image to be processed to obtain a to-be-processed-image feature of the image to be processed. The feature extraction model is obtained by updating, based on a model compatibility loss and a classi-fication loss of a second classification, respective model parameters of a feature extraction model to be trained and an image classification model to be trained. The model com-patibility loss is obtained by a first classification that is performed based on a second image feature via a trained image classification model and adjustment of a classification loss of the first classification based on an inheritance param-eter, the trained image classification model being trained with a trained feature extraction model. The second image feature is extracted from a sample image via the feature extraction model to be trained. The inheritance parameter is based on feature distinctiveness of a first image feature of the sample image. The first image feature is extracted from the sample image by the trained feature extraction model. The classification loss of the second classification is obtained by the second classification that is performed based on the second image feature via the image classification model to be trained.

According to a seventh aspect, this disclosure further provides a feature extraction apparatus, including processing circuitry. The processing circuitry is configured to obtain an image to be processed. The processing circuitry is config-ured to perform, via a feature extraction model, feature extraction on the image to be processed to obtain a to-be-processed-image feature of the image to be processed. The feature extraction model is obtained by updating, based on a model compatibility loss and a classification loss of a second classification, respective model parameters of a feature extraction model to be trained and an image classi-fication model to be trained. The model compatibility loss is obtained by a first classification that is performed based on a second image feature via a trained image classification model and adjustment of a classification loss of the first classification based on an inheritance parameter, the trained image classification model being trained with a trained feature extraction model. The second image feature is extracted from a sample image via the feature extraction model to be trained. The inheritance parameter is based on feature distinctiveness of a first image feature of the sample image. The first image feature is extracted from the sample image by the trained feature extraction model. The classi-fication loss of the second classification is obtained by the second classification that is performed based on the second image feature via the image classification model to be trained.

According to an eighth aspect, this disclosure further provides a computer device, including a memory and a processor, the memory storing computer-readable instruc-tions, and the processor, when executing the computer-readable instructions, implementing the operations of the method embodiments of this disclosure.

According to an eighth aspect, this disclosure further provides a non-transitory computer-readable storage medium storing instructions which when executed by a processor cause the processor to implement the operations of the method embodiments of this disclosure.

According to an eighth aspect, this disclosure further provides a computer device, including computer-readable instructions, the computer-readable instructions, when executed by a processor, implementing the operations of the method embodiments of this disclosure.

Details of one or more embodiments of this disclosure are provided in the accompanying drawings and descriptions below. Other features and advantages of this disclosure become clear with reference to the specification, the accom-panying drawings, and the claims.

BRIEF DESCRIPTION OF THE DRAWINGS

To describe the technical solutions in embodiments of this disclosure more clearly, the following briefly describes the accompanying drawings. The accompanying drawings in the following descriptions show merely exemplary embodi-ments of this disclosure

FIG. 2 is a schematic flowchart of a feature extraction model processing method according to an embodiment.

FIG. 3 is a schematic flowchart of determining an inheri-tance parameter according to an embodiment.

FIG. 4 is a schematic flowchart of a feature extraction method according to an embodiment.

FIG. 5 is a schematic comparative diagram of changes in class centers of different model upgrade paradigms accord-ing to an embodiment.

DESCRIPTION OF EMBODIMENTS

The technical solutions in embodiments of this disclosure are described in the following with reference to the accom-panying drawings. The described embodiments are merely some rather than all of the embodiments of this disclosure. Other embodiments are within the scope of this disclosure.

Figure 1:
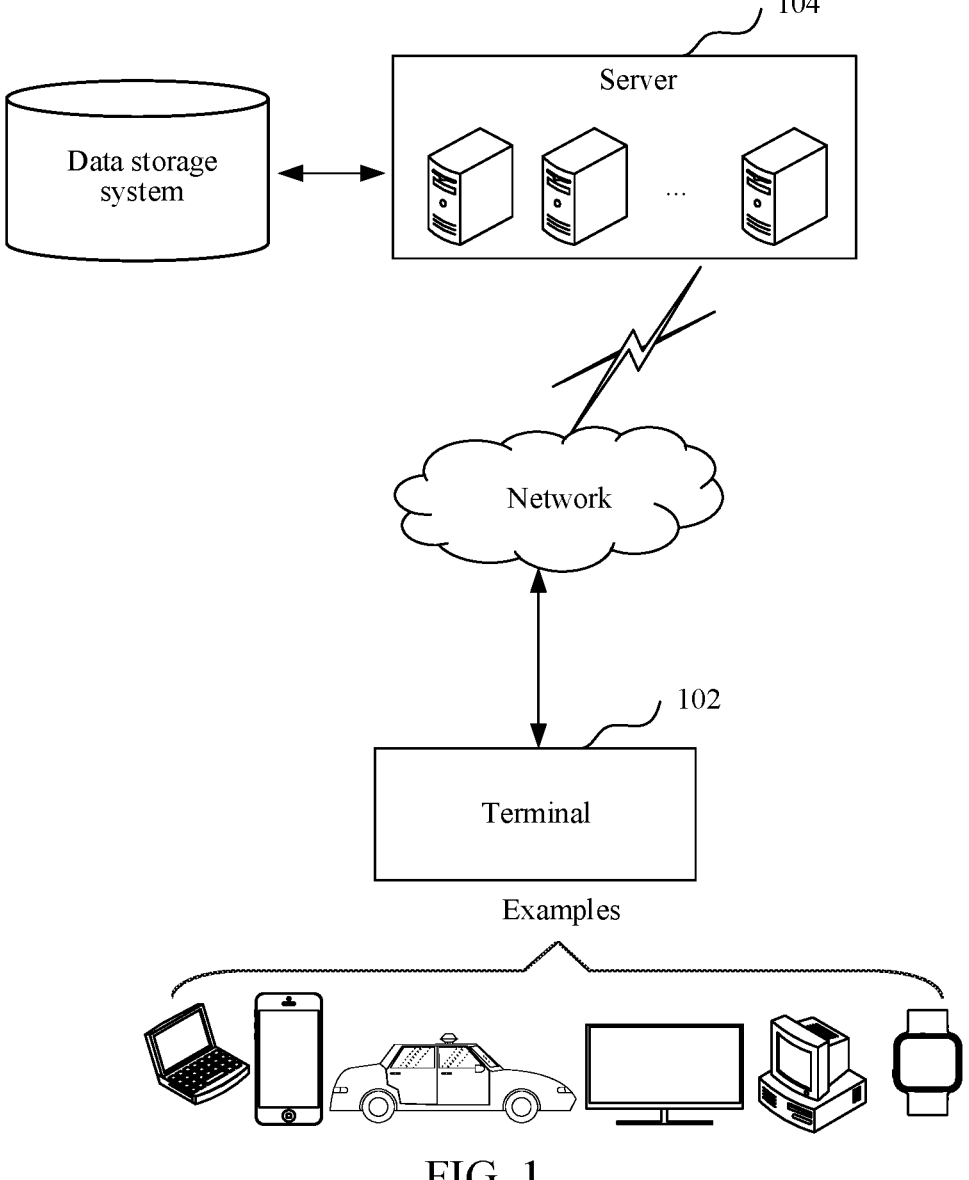
FIG. 1 is a diagram of an application environment of a feature extraction model processing method according to an embodiment.

A feature extraction model processing method provided in an embodiment of this disclosure may be applied to an application environment shown in FIG. 1. A terminal 102 communicates with a server 104 through a network. A data storage system may store data that needs to be processed by the server 104. The data storage system may be integrated on the server 104, or may be placed on cloud or other servers. The terminal 102 may send a sample image to the server 104. The server 104 performs, through a historical image classification model obtained through joint training with a historical feature extraction model, a first classification based on a second image feature extracted from the received sample image by a feature extraction model to be trained, and adjusts a classification loss of the first classification through an inheritance parameter to obtain a model com-patibility loss. The inheritance parameter is obtained based on feature discriminativeness reflected by a first image feature extracted from the sample image by the historical feature extraction model. The server 104 performs a second classification based on the second image feature through an image classification model to be trained, performs model update training based on the model compatibility loss and a classification loss of the second classification, and obtains a trained feature extraction model when the training is completed. The trained feature extraction model may perform feature extraction on an input image to output an image feature of the input image. The server 104 may transplant the trained feature extraction model to the terminal 102, so that the terminal 102 performs feature extraction on the input image through the trained feature extraction model. The server 104 may alternatively receive an image sent by the terminal 102, and perform, through the trained feature extraction model, feature extraction on the image sent by the terminal 102.

A feature extraction method provided in an embodiment of this disclosure may also be applied to the application environment shown in FIG. 1. The terminal 102 or the server 104 may store a pre-trained feature extraction model. The terminal 102 or the server 104 may obtain an image, and input the obtained image input to the feature extraction model. The feature extraction model performs image extraction and outputs an image feature of the image obtained through extraction. The pre-trained feature extraction model may be obtained through training by using the feature extraction model processing method provided in the embodiments of this disclosure.

The terminal 102 may be, but is not limited to, various desktop computers, notebook computers, smartphones, tablet computers, Internet-of-things devices, and portable wearable devices. The Internet-of-things devices may be smart speakers, smart televisions, smart air conditioners, smart vehicle-mounted devices, and the like. The portable wearable devices may be smartwatches, smart bands, head-mounted devices, and the like. The server 104 may be implemented by using an independent server or a server cluster that includes a plurality of servers.

In an embodiment, as shown in FIG. 2, a feature extraction model processing method is provided. The method is performed by a computer device, and specifically, may be a computer device such as a terminal or a server alone, or may be performed by a terminal and a server jointly. In this embodiment of this disclosure, that the method is applied to the server in FIG. 1 is used as an example for description. The method includes the following steps:

Step 202: Obtain a sample image and an inheritance parameter of the sample image, the inheritance parameter being determined based on feature discriminativeness reflected by a first image feature of the sample image, and the first image feature being extracted from the sample image by a trained historical feature extraction model.

The feature extraction model may include an artificial neural network model built based on machine learning (ML), which can extract features from an input image and output the extracted image features. The extracted image features may be used for various processing such as image matching, image classification, and image optimization. For example, ML is a multi-field interdiscipline that relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations. The sample image is a sample for training the feature extraction model. The historical feature extraction model is a trained model. During model update and upgrade processing, the historical feature extraction model is a model that needs to be updated and upgraded. That is, the historical feature extraction model is an old model, while a feature extraction model obtained through retraining is a new model. For example, the historical feature extraction model may be a feature extraction model of a historical version, while the feature extraction model obtained through retraining may be a feature extraction model of the latest version.

The feature extraction performed on the sample image through the historical feature extraction model can obtain the first image feature of the sample image through extraction. Based on the first image feature, various image processing such as image classification and image matching can be performed. The feature discriminativeness (of feature distinctiveness) represents that during the various image processing such as image classification and image matching based on the first image feature, for discriminativeness of different images, a larger quantitative value of feature discriminativeness of an image indicates clearer features for discriminating the image. For example, when image classification is performed based on the first image feature, the feature discriminativeness may be a discrimination capability for different image categories. There is a positive correlation between the accuracy of image classification through the first image feature and the feature discriminativeness reflected by the first image feature, that is, stronger feature discriminativeness indicates a clearer classification feature reflected by the first image feature and it is more beneficial for classification. That is, use of the first image feature can enable more accurate image classification processing. For another example, when image matching is performed based on the first image feature, the feature discriminativeness may be a discrimination capability for different images, that is, stronger feature discriminativeness indicates more accurate matching of the image with another image, so that similar or different pictures can be discriminated. That is, stronger feature discriminativeness reflected by an image feature indicates more accurate expression of a feature of the image by the image feature, so that processing based on the image feature can obtain a more accurate processing result.

For the same image, feature extraction is performed through different feature extraction models, different image features extracted have different feature discriminativeness. For example, when image classification is performed by using the extracted image features, classification results may be different. A more accurate classification result indicates stronger feature discriminativeness of the extracted image feature. The feature discriminativeness may be obtained by performing feature discriminativeness analysis on the extracted image features. For example, classification processing may be performed by using the extracted image features, and feature discriminativeness of the image features is determined based on classification results. For another example, matching processing may be performed by using the extracted image features, and feature discriminativeness of the image features is determined based on matching results. During specific application, the feature discriminativeness may be quantified. For example, quantization may be performed to obtain feature discriminativeness parameters, which specifically may be quantitative values ranging from 0 to 100, or may be quantitative values ranging from 0 to 1 after normalization, so that the feature discriminativeness parameters can be used for quantitative comparison of the feature discriminativeness of the image features of the images.

The inheritance parameter is determined based on the feature discriminativenes s reflected by the image feature. Each sample image may have a corresponding inheritance parameter. Stronger feature discriminativeness reflected by an image feature indicates a more accurate result that can be obtained by performing image processing by using the image feature. In this case, the more accurately the image feature can express the corresponding image, the more worthy the image feature is of inheritance and learning by a new model. The inheritance parameter may be used for representing a degree of inheritance of an image feature, which specifically may represent a contribution value of an image feature extracted by an old model to an image feature extracted by the new model. The larger the contribution value represented by the inheritance parameter, the greater the impact of the image feature extracted by the old model on a result of the feature extraction of the new model. For example, the inheritance parameter may include an inheritance weight. An image feature worthy of inheritance and learning by the new model, that is, an image feature with strong feature discriminativeness, may have a higher inheritance weight. An image feature with weaker feature discriminativeness may have a lower inheritance weight. In this way, the feature discriminativeness reflected by the image feature is selectively inherited and learned by the new model, so that the new model can learn effective image feature knowledge. For example, for an image feature A, an image feature B, and an image feature C, if in terms of feature discriminativeness, the image feature A is greater than the image feature B greater than the image feature C, in terms of correspondingly set inheritance weights, the image feature A is also greater than the image feature B greater than the image feature C. This can cause the new model to focus on learning and inheriting image features with strong feature discriminativeness, thereby improving the effectiveness of image feature extraction. In addition, the inheritance parameter may also include the number of inheritance times. For an image feature with strong feature discriminativeness, the number of inheritance times of the image feature can be increased, that is, the importance of compatible training for the image feature is increased. For an image feature with weak feature discriminativeness, the number of inheritance times of the image feature can be reduced, that is, the importance of compatible training for the image feature is reduced.

Specifically, the server may obtain the sample image and the inheritance parameter of the sample image. The inheritance parameter of the sample image may be determined based on the feature discriminativeness reflected by the first image feature after the server extracts the first image feature from the sample image through the trained historical feature extraction model in advance. During specific implementation, the server may establish a mapping relationship between inheritance parameters and sample images. The inheritance parameter of the sample image can be obtained by looking up the mapping relationship. For example, after determining the inheritance parameter of the sample image, the server may write the inheritance parameter into image attribute information of the sample image. After training the new model to obtain the sample image, the server may extract the inheritance parameter from the image attribute information of the sample image.

Step 204: Extract a second image feature from the sample image through a feature extraction model to be trained.

The feature extraction model to be trained is a feature extraction model that needs to be retrained and is a new model. To be compatible with the trained historical feature extraction model, the feature extraction model to be trained needs to perform compatibility processing on a feature extracted by an old model, so that the new model obtained by training can be effectively compatible with the old model. The second image feature is extracted from the sample image through a new model that needs to be trained, that is, through the feature extraction model to be trained. Specifically, the server determines the feature extraction model to be trained, and performs feature extraction on the sample image through the feature extraction model to be trained, for example, the sample image may be input to the feature extraction model to be trained, to obtain the second image feature of the sample image.

Step 206: Perform a first classification based on the second image feature through a historical image classification model obtained through joint training with the historical feature extraction model to obtain a classification result of the first classification, determine a classification loss of the first classification according to the classification result of the first classification, and adjust the classification loss of the first classification through the inheritance parameter to obtain a model compatibility loss.

The historical image classification model is a trained model used for image classification. The historical image classification model is obtained through joint training with the historical feature extraction model, that is, the historical image classification model is obtained through simultaneous training with the historical feature extraction model. Specifically, an image feature of a trained sample image may be extracted by using the historical feature extraction model, and the historical image classification model performs image classification processing on the extracted image feature. The historical image classification model and the historical feature extraction model are updated, respectively, based on an image classification result. For example, the training continues after model parameters of the historical image classification model and the historical feature extraction model are updated, until the training is ended, and a trained historical feature extraction model and a trained historical image classification model are obtained. The trained historical feature extraction model may perform feature extraction on an input image. An extracted image feature may be used for processing, such as image classification and image matching, of the image. The trained historical image classification model may perform image classification on an input image feature to determine a category to which the image belongs.

The first classification refers to the image classification processing performed through the historical image classification model on the second image feature extracted by the feature extraction model to be trained. The classification loss of the first classification can be obtained by performing the first classification on the second image feature. Specifically, after the classification result of the first classification is obtained, the classification loss of the first classification may be further determined based on the classification result of the first classification. The classification loss of the first classification may be determined based on a difference between the classification result of the first classification and a real category label of the sample image. A specific form of the classification loss of the first classification may be set according to actual needs. For example, the form may include, but is not limited to, a log-likelihood loss, a hinge loss, a cross-entropy loss, a Softmax loss, an additive angular margin (ArcFace) loss, and other forms of various loss functions. The model compatibility loss is a loss obtained after adjusting the classification loss of the first classification through the inheritance parameter. Through the adjustment of the classification loss of the first classification through the inheritance parameter, the feature discriminativeness reflected by the inheritance parameter can be used to selectively inherit and learn the first image feature carried in the historical feature extraction model. Specifically, a weight of a poor sample may be reduced and a weight of a good sample may be increased, thereby effectively inheriting and learning the knowledge included in the old model. The model compatibility loss reflects a loss obtained when the new model is compatible with the old model, that is, a loss obtained when the feature extraction model to be trained is compatible with the historical feature extraction model.

Specifically, the server may obtain the trained historical image classification model. The historical image classification model may be a classifier model obtained through joint training with the historical feature extraction model, and is used for performing image classification processing on the extracted image feature. The server performs the first classification based on the second image feature through the historical image classification model to obtain the classification result of the first classification, and determines the classification loss of the first classification based on the classification result of the first classification. For example, the server may obtain the classification loss of the first classification according to a difference between a classification combination of the first classification and a real category label of the sample image. The server adjusts the classification loss of the first classification through the inheritance parameter. For example, when the inheritance parameter includes an inheritance weight, the classification loss of the first classification may be weighted based on the inheritance weight to obtain the model compatibility loss.

Step 208: Perform a second classification based on the second image feature through an image classification model to be trained to obtain a classification result of the second classification, and obtain a classification loss of the second classification according to the classification result of the second classification.

The image classification model to be trained is a retrained image classification model, used for performing image classification processing on the image feature extracted by the feature extraction model to be trained. That is, the image classification model to be trained and the feature extraction model to be trained are also jointly trained to obtain the image classification model and the feature extraction model through the simultaneous training. Performing the second classification based on the second image feature through the image classification model to be trained is classifying a feature extracted by a new feature extraction model through a new image classification model, and the classification loss of the second classification may be obtained. Specifically, after the classification result of the second classification is obtained, the classification loss of the second classification may be further determined based on the classification result of the second classification. The classification loss of the second classification may be determined based on a difference between the classification result of the second classification and a real category label of the sample image.

Specifically, the server may perform, through the image classification model that is to be jointly trained with the feature extraction model to be trained, the second classification based on the second image feature extracted by the feature extraction model to be trained to obtain the classification result of the second classification, and determine the classification loss of the second classification based on the classification result of the second classification. Specifically, the server may determine the classification loss of the second classification according to a difference between the classification result of the second classification and a real category label of the sample image. A specific form of the classification loss of the second classification may be set according to actual needs. For example, the form may include, but is not limited to, a log-likelihood loss, a hinge loss, a cross-entropy loss, a Softmax loss, an ArcFace loss, and other various forms of losses.

Step 210: Update, based on the model compatibility loss and the classification loss of the second classification, respective model parameters of the feature extraction model to be trained and the image classification model to be trained, and then continue to perform joint training to obtain a trained feature extraction model.

The feature extraction model to be trained and the image classification model to be trained are jointly trained, that is, according to a loss during training, respective model parameters of the feature extraction model to be trained and the image classification model to be trained are updated, respectively, and then the training continues. The model parameters may include parameters of various layer structures in the models, such as a weight parameter and a hyperparameter. The loss in training includes the model compatibility loss and the classification loss of the second classification. Specifically, the loss in training may be obtained according to a sum of the model compatibility loss and the classification loss of the second classification, the feature extraction model to be trained and the image classification model to be trained are updated based on the loss in training, and then joint training continues to be performed to obtain the trained feature extraction model.

Specifically, the server may update, according to the model compatibility loss and the classification loss of the second classification, new models including the feature extraction model to be trained and the image classification model to be trained. Specifically, the respective model parameters of the feature extraction model to be trained and the image classification model to be trained may be updated, and after the models are updated, the joint training is continued, that is, the joint training is performed by using a next sample image, until the training is completed. For example, if the training meets a convergence condition, the model accuracy meets a preset accuracy condition, the number of training samples reaches a quantity condition, and the like, the trained feature extraction model and the trained image classification model are obtained. The trained feature extraction model may perform feature extraction on an input image to extract an image feature of the input image. The trained image classification model may perform image classification on an input image feature, which specifically may be the image feature extracted by the trained feature extraction model, to determine an image category to which an image feature source image belongs. During specific application, the image classification model is used for assisting in the training of the feature extraction model. Finally, the trained feature extraction model may be obtained to perform feature extraction processing on the image through the trained feature extraction model.

In the feature extraction model processing method described above, a first classification is performed, through a historical image classification model obtained through joint training with a historical feature extraction model, based on a second image feature extracted from a sample image by a feature extraction model to be trained, and a classification loss of the first classification is adjusted through an inheritance parameter to obtain a model compatibility loss. The inheritance parameter is obtained based on feature discriminativeness reflected by a first image feature extracted from the sample image by the historical feature extraction model. A second classification is performed based on the second image feature through an image classification model to be trained. Model update training is performed based on the model compatibility loss and a classification loss of the second classification. In this way, the features extracted by the historical feature extraction model may be selectively inherited through the inheritance parameter determined based on the features extracted by the historical feature extraction model. In this way, the knowledge of the historical feature extraction model can be effectively learned, so that the feature extraction model obtained through training can improve the effectiveness of image feature extraction while ensuring model compatibility with the historical feature extraction model.

In an embodiment, as shown in FIG. 3, the feature extraction model processing method further includes the processing of determining the inheritance parameter, specifically including the following steps:

Step 302: Extract the first image feature from the sample image through the historical feature extraction model.

The historical feature extraction model is an old feature extraction model that has been trained. A retrained new feature extraction model needs to be compatible with the historical feature extraction model, that is, compatible with a feature extraction result of the historical feature extraction model. The first image feature is an image feature obtained by performing feature extraction on the sample image through the old feature extraction model, that is, the historical feature extraction model.

Specifically, the server may obtain the historical feature extraction model that has been trained. When there are a plurality of old feature extraction models, a version of the historical feature extraction model may be selected according to actual needs. The historical feature extraction model may be a new feature extraction model, that is, may be an old feature extraction model that needs to be compatible with the feature extraction model to be trained. The server performs feature extraction on the sample image through the historical feature extraction model. Specifically, the sample image may be input into the historical feature extraction model, and the historical feature extraction model outputs the extracted first image feature. The first image feature may reflect feature extraction performance of the historical feature extraction model for the sample image. The more accurate and effective the first image feature is in expressing the sample image, the higher the accuracy of image feature extraction by the historical feature extraction model.

Step 304: Perform an image classification on the first image feature through the historical image classification model to obtain an image category classification result.

The historical image classification model is an old image classification model that has been trained. A retrained new feature extraction model needs to be compatible with the historical image classification model, that is, compatible with an image classification result of the historical image classification model. The historical image classification model is obtained through joint training with the historical feature extraction model, that is, the historical image classification model has a correspondence with the historical feature extraction model. The image category classification result is an image classification result obtained by the historical image classification model by performing image classification on the first image feature extracted by the historical feature extraction model. The image category classification result may include a probability distribution of the sample image corresponding to each image category.

Specifically, the server may obtain the historical image classification model that has been trained. There is a correspondence between the historical image classification model and the historical feature extraction model. The historical image classification model and the historical feature extraction model are obtained through joint training. After determining the historical feature extraction model, the server may determine the historical image classification model according to the correspondence in the joint training. The server performs image classification on the first image feature through the historical image classification model. Specifically, the first image feature may be input into the historical image classification model, and the historical image classification model outputs an image category classification result. A result of the image classification performed by the historical image classification model on the sample image based on the first image feature may be determined based on the image category classification result, that is, a classification category of the sample image may be determined.

Step 306: Determine the inheritance parameter of the sample image according to the image category classification result.

The inheritance parameter is determined based on the feature discriminativeness reflected by an image feature. The inheritance parameter may be used for representing a degree of inheritance of the image feature. For example, the inheritance parameter may include an inheritance weight. An image feature worthy of inheritance and learning by the new model, that is, an image feature with strong feature discriminativeness, may have a higher inheritance weight.

Specifically, the server determines the inheritance parameter of the sample image based on the image category classification result. Specifically, the inheritance parameter of the sample image may be determined according to a discrete degree of a corresponding probability distribution of each image category in the image category classification result. Strong discreteness of the corresponding probability distribution of each image category indicates that the probability distribution of each category is not clear when image classification is performed on the first image feature and that the feature discriminativeness of the first image feature is limited. For example, image category classification results for different sample images are $(1, 0, 0, 0)$, $(0.8, 0, 0.2, 0)$, $(0.5, 0.3, 0.1, 0.1)$, and $(0.2, 0.2, 0.2, 0.4)$, respectively. For the image category classification result $(1, 0, 0, 0)$, a probability of each category corresponding thereto is the most concentrated. In this case, feature classification discriminativeness of an image feature corresponding to this image category classification result is the strongest, and image classification can be accurately performed based on this image feature. In this way, this sample image can be determined as a high-quality sample, and an inheritance weight of this sample can be increased to obtain an inheritance parameter of the sample image.

In this embodiment, the server extracts the first image feature of the sample image through the historical feature extraction model, and performs image classification on the first image feature through the historical image classification model. The server determines the inheritance parameter of the sample image according to the obtained image category classification result, and can determine the inheritance parameter of the sample image based on a classification representation of image classification performed on the sample image through the old model. The inheritance parameter can reflect the feature discriminativeness of the image feature extracted from the sample image by the old model, so that the trained feature extraction model can selectively inherit the features extracted by the historical feature extraction model and can effectively learn the knowledge of the historical feature extraction model, thereby improving the effectiveness of image feature extraction while ensuring model compatibility of the feature extraction model obtained through training with the historical feature extraction model.

In an embodiment, the determining the inheritance parameter of the sample image according to the image category classification result includes: determining a category cross entropy parameter based on the image category classification result; normalizing the category cross entropy parameter to obtain a discriminativeness parameter, the discriminativeness parameter being used for measuring the feature discriminativeness of the first image feature; and determining the inheritance parameter of the sample image according to the discriminativeness parameter.

The image category classification result may include a probability distribution of the sample image corresponding to each image category. The category cross entropy parameter is a cross entropy determined based on the image category classification result. The feature discriminativeness of the first image feature may be measured through a cross entropy between image category classification results. The category cross entropy parameter has a negative correlation with the feature discriminativeness of the first image feature, that is, the stronger the feature discriminativeness of the first image feature, the clearer the feature of the first image feature, and the smaller the value of the category cross entropy parameter thereof, that is, the more concentrated the category distribution. The weaker the feature discriminativeness of the first image feature, the less clear the feature of the first image feature, and the larger the value of the category cross entropy parameter thereof, that is, the more dispersed the category distribution. Normalization is a dimensionless processing means that changes an absolute value of a physical system value into a relative value relationship. Specifically, the category cross entropy parameter may be mapped to an interval range of 0 to 1 through normalization. The discriminativeness parameter is a processing result obtained after normalizing the category cross entropy parameter. The discriminativeness parameter may be used for measuring the feature discriminativeness of the first image feature. The inheritance parameter of the sample image may be determined based on the discriminativeness parameter. For example, when the inheritance parameter includes an inheritance weight, the discriminativeness parameter can be converted into a weight in the range of 0 to 1 to obtain the inheritance weight of the sample image.

Specifically, the server may determine the category cross entropy parameter based on the image category classification result. For example, the category cross entropy parameter may be obtained by calculating respective cross entropies of corresponding probability distributions of all the image categories in the image category classification result. The server normalizes the category cross entropy parameter to obtain a discriminativeness parameter. The discriminativeness parameter may be used for measuring the feature discriminativeness of the first image feature. For example, when the discriminativeness parameter is a numerical parameter, a value of the discriminativeness parameter may have a negative correlation with the feature discriminativeness of the first image feature. That is, the stronger the feature discriminativeness of the first image feature, the smaller the value of the discriminativeness parameter. The server determines the inheritance parameter of the sample image according to the discriminativeness parameter. Specifically, the server may set the inheritance weight of the sample image based on the discriminativeness parameter, and use the inheritance weight as the inheritance parameter of the sample image.

In this embodiment, the discriminativeness parameter for measuring the feature discriminativeness of the first image feature is determined through the cross entropy of the image category classification result, and the inheritance parameter of the sample image is determined based on the discriminativeness parameter, so that the inheritance parameter can effectively reflect the feature discriminativeness of the image feature extracted from the sample image by the old model, allowing, based on the inheritance parameter, the trained feature extraction model to be capable of selectively inheriting the features extracted by the historical feature extraction model, thereby improving the effectiveness of image feature extraction while ensuring model compatibility of the feature extraction model obtained through training with the historical feature extraction model.

In an embodiment, the inheritance parameter includes an inheritance weight, and there is a positive correlation between a value of the inheritance weight and a metric value of the feature discriminativeness. The adjusting the classification loss of the first classification through the inheritance parameter to obtain a model compatibility loss includes: weighting the classification loss of the first classification according to the inheritance weight to obtain the model compatibility loss.

There is a positive correlation between the value of the inheritance weight and the metric value of the feature discriminativeness, and the metric value of the feature discriminativeness is a quantitative parameter used for measuring the strength of the feature discriminativeness. The stronger the feature discriminativeness of the image feature, the larger the metric value of the feature discriminativeness, and the larger the value of the corresponding inheritance weight. In this way, the inheritance and learning of the image feature with strong feature discriminativeness can be highlighted. The classification loss of the first classification reflects the classification performance of the image classification performed on the second image feature through the historical image classification model, and can be determined through a designed classification loss function. The model compatibility loss is a loss obtained after adjusting the classification loss of the first classification through the inheritance parameter. The model compatibility loss reflects a loss obtained when the new model is compatible with the old model, that is, a loss obtained when the feature extraction model to be trained is model compatible with the historical feature extraction model. A larger value of the model compatibility loss indicates a greater adverse impact of the feature extraction model to be trained on the effectiveness of the feature extraction thereof in order to be compatible with the historical feature extraction model.

Specifically, the inheritance parameter includes an inheritance weight, and there is a positive correlation between a value of the inheritance weight and a metric value of the feature discriminativeness. The server may obtain the classification loss of the first classification, and specifically, may determine the classification loss of the first classification according to the classification result of the first classification, or may determine the classification loss of the first classification according to the second image feature and the model parameter of the historical image classification model. A manner of determining the classification loss of the first classification may be determined according to a loss function actually involved. The server weights the classification loss of the first classification according to the inheritance weight in the inheritance parameter. Specifically, classification losses of all sample images in the same training batch may be weighted and summed to obtain a model compatibility loss of the training batch. Different sample images may correspond to different inheritance weights. The classification losses of different sample images are adjusted through the inheritance weights. In this way, the training of the feature extraction model is adjusted, so that the feature extraction model can focus on the inheritance of features of good sample during the training, thereby achieving selective inheritance of features.

In this embodiment, the server may weight the classification loss of the first classification through the inheritance weight included in the inheritance parameter to obtain the model compatibility loss, and adjusts the training of the feature extraction model by using the model compatibility loss, so that the feature extraction model can focus on the inheritance of features of a good sample during the training, thereby improving the effectiveness of image feature extraction while ensuring model compatibility of the feature extraction model obtained through training with the historical feature extraction model.

In an embodiment, the performing a first classification based on the second image feature through a historical image classification model obtained through joint training with the historical feature extraction model to obtain a classification result of the first classification includes: determining the historical image classification model obtained through joint training with the historical feature extraction model and a category label of the sample image; determining, based on the category label, a historical classification model parameter of the historical image classification model for a category to which the sample image belongs; and obtaining the classification result of the first classification according to the second image feature and the historical classification model parameter.

The category label is a category to which the sample image actually belongs. The historical classification model parameter may include a weight parameter obtained when images belonging to the category label are classified in the historical image classification model. That is, images belonging to the same category label can correspond to the same historical classification model parameter. The historical classification model parameter may specifically include a weight value of an image category indicated by the category label in the historical image classification model. A value of a probability that the sample image belongs to the image category indicated by the category label can be calculated by using the historical classification model parameter and the second image feature, so that the historical image classification model performs the first classification on the sample image to obtain the classification result of the first classification performed by the historical image classification model on the sample image.

Specifically, the server may determine the historical image classification model obtained through joint training with the historical feature extraction model. The historical image classification model is obtained through simultaneous training with the historical feature extraction model. For example, an image feature of a trained sample image may be extracted by using the historical feature extraction model, and the historical image classification model performs image classification processing on the extracted image feature. The historical image classification model and the historical feature extraction model are updated, respectively, based on an image classification result. For example, the training continues after model parameters of the historical image classification model and the historical feature extraction model are updated, until the training is ended, and a trained historical feature extraction model and a trained historical image classification model are obtained. The server determines the category label of the sample image. The category label is used for indicating an image category to which the sample image actually belongs. The server determines, based on the category label of the sample image, the historical classification model parameter of the historical image classification model for the category to which the sample image belongs. Specifically, the historical classification model parameter for the category to which the sample image belongs may be determined based on results of classification performed on images of various categories by the historical image classification model. Specifically, the historical classification model parameter may include the weight value of the image category indicated by the category label in the historical image classification model. The server can obtain the classification result of the first classification according to the second image feature and the historical classification model parameter. For example, the server can obtain the classification result of the first classification according to a product of the second image feature and the historical classification model parameter, so that the historical image classification model performs the first classification on the sample image.

In this embodiment, the server obtains the classification result of the first classification according to the second image feature and the historical classification model parameter in the historical image classification model, thereby classifying the sample image through the historical image classification model. The classification loss of the first classification can be determined based on the classification result of the first classification. The classification performance of the first classification can be accurately expressed through the classification loss of the first classification. This helps ensure a training effect of the feature extraction model, and can improve both the performance of the feature extraction model and the training efficiency.

In an embodiment, the determining a classification loss of the first classification according to the classification result of the first classification includes: obtaining the classification loss of the first classification based on an angle interval between the second image feature and the historical classification model parameter in the classification result of the first classification.

The historical classification model parameter includes a weight parameter obtained when images belonging to the category label are classified in the historical image classification model. That is, images belonging to the same category label can correspond to the same historical classification model parameter. The classification loss of the first classification can be determined according to the angle interval between the second image feature and the historical classification model parameter.

Specifically, the server constructs the classification loss of the first classification in a form of an ArcFace loss function. The server may determine the historical classification model parameter in the classification result of the first classification, and determine the classification loss of the first classification based on the second image feature and the historical classification model parameter in the classification result of the first classification. The server may determine the angle interval between the second image feature and the historical classification model parameter. Specifically, the server may normalize the second image feature and the historical classification model parameter separately, determine an angle between the normalized second image feature and the normalized historical classification model parameter, add an angle interval, and obtain, based on a Softmax function constructed after the angle interval is added, a loss function in the form of ArcFace as the classification loss of the first classification.

In this embodiment, the classification loss of the first classification is obtained through construction based on the angle interval between the second image feature and the historical classification model parameter in the classification result of the first classification, so that the classification performance of the first classification can be accurately expressed through the classification loss. This helps ensure a training effect of the feature extraction model, and can improve both the performance of the feature extraction model and the training efficiency.

In an embodiment, the determining a classification loss of the first classification according to the classification result of the first classification includes: determining the classification loss of the first classification based on a difference between the classification result of the first classification and the category label of the sample image.

Specifically, the server may determine a difference between the classification result of the first classification and the category label of the sample image. The difference can represent a degree of accuracy of the classification result of the first classification. The server can determine, based on the difference between the classification result of the first classification and the category label of the sample image, the classification loss of the first classification in the form of various loss functions such as a log-likelihood loss, a hinge loss, a cross-entropy loss, and a Softmax loss.

In this embodiment, the server can determine the classification loss directly by using the difference between the classification result of the first classification and the category label of the sample image, so that the classification performance of the first classification can be accurately expressed through various forms of classification losses. This helps ensure a training effect of the feature extraction model and can improve the performance of the feature extraction model.

In an embodiment, the performing a second classification based on the second image feature through an image classification model to be trained to obtain a classification result of the second classification, and obtaining a classification loss of the second classification according to the classification result of the second classification includes: performing the second classification based on the second image feature through the image classification model to be trained to obtain the classification result of the second classification; and determine the classification loss of the second classification based on a difference between the classification result of the second classification and the category label carried by the sample image.

The classification loss of the second classification is used for representing a classification effect of the second classification. The classification effect of the second classification can be quantitatively analyzed through a difference between the classification result of the second classification and the category label carried by the sample image to obtain the classification loss of the second classification. Specifically, the server may perform the second classification based on the second image feature through the image classification model to be trained. Specifically, the second image feature may be input into the image classification model to be trained, so that the image classification model to be trained outputs the classification result of the second classification. The server obtains the category label carried by the sample image, determines a classification difference between the category label and the classification result of the second classification, and obtains the classification loss of the second classification through calculation based on the classification difference. During specific application, for different designed forms of classification losses, the classification loss of the second classification can be calculated in different calculation manners. For example, the classification loss of the second classification may be constructed in the form of an ArcFace loss function to obtain a loss function in the form of ArcFace as the classification loss of the second classification.

In this embodiment, the second classification is performed on the second image feature through the image classification model to be trained. The classification loss of the second classification is determined based on the difference between the classification result of the second classification and the category label carried by the sample image, so that the classification performance of the second classification can be accurately expressed through the classification loss. This helps ensure a training effect of the feature extraction model, and can improve both the performance of the feature extraction model and the training efficiency.

In an embodiment, the updating, based on the model compatibility loss and the classification loss of the second classification, respective model parameters of the feature extraction model to be trained and the image classification model to be trained, and then continuing to perform joint training to obtain a trained feature extraction model includes: obtaining a loss in training according to a sum of the model compatibility loss and the classification loss of the second classification; and update, based on the loss in the training, the respective model parameters of the feature extraction model to be trained and the image classification model to be trained, and then continue to perform joint training, until a training end condition is met, and end the training to obtain the trained feature extraction model.

The training end condition is used for determining whether to end the joint training, and may specifically include, but is not limited to, at least one of the following cases: the training meets a convergence condition, the model accuracy meets a preset accuracy condition, and the number of training samples reaches a quantity condition. Specifically, the server may obtain the loss in the training according to the sum of the model compatibility loss and the classification loss of the second classification. That is, the sum of the model compatibility loss and the classification loss of the second classification may be used as the loss in the training. For example, the server can also weight and sum up the model compatibility loss and the classification loss of the second classification, that is, perform weighted summation according to respective weights of the model compatibility loss and the classification loss of the second classification to obtain the loss in the training. The respective weights of the model compatibility loss and the classification loss of the second classification may be set according to actual needs, for example, according to an empirical value. The empirical value may be obtained through a plurality of experiments.

The server updates, by using the loss in the training, the respective model parameters of the feature extraction model to be trained and the image classification model to be trained, continues to perform joint training after the update, and ends the training when a training end condition is met, for example, ends the training when the training meets a convergence condition, the model accuracy meets a preset accuracy condition, or the number of training samples reaches a quantity condition, to obtain the trained feature extraction model.

In this embodiment, the server continues the training after updating the models by using the sum of the model compatibility loss and the classification loss of the second classification. This can accurately adjust the model parameters by integrating the model compatibility loss and the classification loss of the second classification, and help ensure a training effect of the feature extraction model, thereby improving the performance of the feature extraction model.

In an embodiment, the feature extraction model processing method further includes: performing feature mapping on the first image feature through a feature evolution model to be trained to obtain a mapping feature of the first image feature; and performing a third classification based on the mapping feature through the image classification model to be trained to obtain a classification result of the third classification, and obtaining a classification loss of the third classification according to the classification result of the third classification. The updating, based on the model compatibility loss and the classification loss of the second classification, respective model parameters of the feature extraction model to be trained and the image classification model to be trained, and then continuing to perform joint training to obtain a trained feature extraction model includes: updating, based on the model compatibility loss, the classification loss of the second classification, and the classification loss of the third classification, respective model parameters of the feature extraction model to be trained, the image classification model to be trained, and the feature evolution model to be trained, and then continuing to perform joint training to obtain the trained feature extraction model.

The feature evolution model is used for performing feature mapping processing on input image features (extracted by the old model), so that the input image features can be evolved to optimize the input image features. The feature evolution model to be trained may be jointly trained with the feature extraction model to be trained and the image classification model to be trained. That is, the feature extraction model, the image classification model, and the feature evolution model may be simultaneously trained. When the training is completed, the trained feature extraction model, the trained image classification model, and the trained feature evolution model can be obtained. The trained feature extraction model may perform feature extraction on an input image and output an image feature. The trained image classification model may perform image classification on the input image feature and output an image classification category. The feature evolution model may perform feature mapping on the input image feature and output an image feature after the mapping. The image feature after the mapping may be used for image processing, such as image classification or image matching.

The mapping feature of the first image feature is an image feature obtained after performing feature mapping on the first image feature through the feature evolution model. Feature optimization can be performed, through the added feature evolution model, on the first image feature extracted from the sample image by the historical feature extraction model, so that the first image feature evolves towards a better feature latent space, thereby helping optimize features of images in an image library. The third classification refers to the processing of image classification based on the mapping feature by the image classification model to be trained. The feature extraction model, the image classification model, and the feature evolution model are further jointly trained in combination with the classification loss of the third classification to obtain the trained feature extraction model.

Specifically, the server may determine the feature evolution model to be trained. The feature evolution model is to be trained to optimize a feature extracted by the historical feature extraction model, to achieve feature backfilling in a lightweight and efficient manner, thereby further improving a gain achieved by upgrading a retrieval system model. The server may perform feature mapping on the first image feature through the feature evolution model. Specifically, the first image feature may be input into the feature evolution model to be trained, so that the feature evolution model to be trained outputs the mapping feature of the first image feature. The server performs the third classification based on the mapping feature through the image classification model to be trained. Specifically, the mapping feature may be input into the image classification model to be trained, and the image classification model to be trained performs image classification to obtain the classification result of the third classification. The server may obtain the classification loss of the third classification based on the classification result of the third classification. Specifically, the classification loss of the third classification may be determined according to a difference between the classification result of the third classification and an actual category label of the sample image. A specific form of a loss function of the classification loss of the third classification may be flexibly set according to actual needs. For example, the form may include, but is not limited to, a log-likelihood loss, a hinge loss, a cross-entropy loss, a Softmax loss, an ArcFace loss, and other forms of various loss functions. The server updates, based on the model compatibility loss, the classification loss of the second classification, and the classification loss of the third classification, respective model parameters of the feature extraction model to be trained, the image classification model to be trained, and the feature evolution model to be trained, and then continues to perform joint training, until the training is completed, to obtain the trained feature extraction model. During specific application, the server may obtain a target loss of the joint training according to the model compatibility loss, the classification loss of the second classification, and the classification loss of the third classification, and update, based on the target loss, the feature extraction model to be trained, the image classification model to be trained, and the feature evolution model to be trained, respectively. Specifically, the model parameters of the models to be trained may be updated, and the training continues after the update, until the training ends, to obtain the trained feature extraction model.

In this embodiment, feature mapping is performed, through the feature evolution model, on the image feature extracted by the historical feature extraction model. The third classification is performed on the obtained mapping feature through the image classification model to be trained. In addition, based on the classification loss of the third classification, the feature extraction model to be trained, the image classification model to be trained, and the feature evolution model to be trained are updated, respectively, and then continue to be jointly trained. Feature optimization may be performed on the first image feature extracted from the sample image by the historical feature extraction model, so that the first image feature evolves towards a better feature latent space, thereby helping optimize features of images in an image library.

In an embodiment, the updating, based on the model compatibility loss, the classification loss of the second classification, and the classification loss of the third classification, respective model parameters of the feature extraction model to be trained, the image classification model to be trained, and the feature evolution model to be trained, and then continuing to perform joint training includes: obtaining a target loss of the joint training according to the model compatibility loss, the classification loss of the second classification, and the classification loss of the third classification; updating, based on the target loss, the respective model parameters of the feature extraction model to be trained, the image classification model to be trained, and the feature evolution model to be trained, and then continuing to perform the joint training.

The target loss refers to an overall loss of the joint training of the feature extraction model to be trained, the image classification model to be trained, and the feature evolution model to be trained, and specifically, may be obtained through construction according to the model compatibility loss, the classification loss of the second classification, and the classification loss of the third classification. For example, a sum of the model compatibility loss, the classification loss of the second classification, and the classification loss of the third classification may be used as the target loss of the joint training.

Specifically, the server obtains the target loss of the joint training through construction according to the model compatibility loss, the classification loss of the second classification, and the classification loss of the third classification. For example, the server may directly use the sum of the model compatibility loss, the classification loss of the second classification, and the classification loss of the third classification as the target loss of the joint training, that is, as an overall training target of the joint training. The server performs the joint training based on the target loss, that is, updates, based on the target loss, the feature extraction model to be trained, the image classification model to be trained, and the feature evolution model to be trained, respectively, for example, updates the model parameters of the models to be trained, and then continues to perform the joint training, until the training ends, to obtain the trained feature extraction model.

In this embodiment, the overall target loss is constructed according to the model compatibility loss, the classification loss of the second classification, and the classification loss of the third classification, and the feature extraction model to be trained, the image classification model to be trained, and the feature evolution model to be trained are jointly trained according to the target loss. In this way, the feature extraction model can be trained from a plurality of dimensions, so that the feature extraction model obtained through training can improve the effectiveness of image feature extraction while ensuring model compatibility with the historical feature extraction model.

In an embodiment, the obtaining a target loss of the joint training according to the model compatibility loss, the classification loss of the second classification, and the classification loss of the third classification includes: obtaining the target loss of the joint training according to a sum of the model compatibility loss, the classification loss of the second classification, and the classification loss of the third classification.

Specifically, the server can obtain the target loss of the joint training according to a sum of the model compatibility loss, the classification loss of the second classification, and the classification loss of the third classification. During specific implementation, the server may further perform weighted summation on the model compatibility loss, the classification loss of the second classification, and the classification loss of the third classification, that is, perform weighted summation according to respective weights of the model compatibility loss, the classification loss of the second classification, and the classification loss of the third classification to obtain the target loss of the joint training. The respective weights of the model compatibility loss, the classification loss of the second classification, and the classification loss of the third classification may be set according to actual needs, for example, according to an empirical value. The empirical value may be obtained through a plurality of experiments.

In this embodiment, the server determines the target loss by using the sum of the model compatibility loss, the classification loss of the second classification, and the classification loss of the third classification. This can accurately adjust the model parameters by integrating the model compatibility loss, the classification loss of the second classification, and the classification loss of the third classification, and help ensure a training effect of the feature extraction model, thereby improving the performance of the feature extraction model.

In an embodiment, the feature extraction model processing method further includes: determining a to-be-queried-image feature library associated with the historical feature extraction model, the to-be-queried-image feature library including respective to-be-queried-image features of images to be queried, and the to-be-queried-image features being extracted by the historical feature extraction model from the images to be queried; performing feature mapping on the to-be-queried-image features through a trained feature evolution model to obtain respective to-be-queried-image mapping features of the images to be queried; and updating the to-be-queried-image feature library based on the to-be-queried-image mapping features to obtain a to-be-queried-image feature library associated with the trained feature extraction model.

There is an association relationship between the to-be-queried-image feature library and the historical feature extraction model. That is, the to-be-queried-image features included in the to-be-queried-image feature library are extracted by the historical feature extraction model from the images to be queried. The to-be-queried-image features of the images to be queried are obtained through extraction by the historical feature extraction model, and the to-be-queried-image feature library associated with the historical feature extraction model is constructed. When a user inputs a query image for image query, the server may extract a feature of the query image through the historical feature extraction model, and use the extracted image feature to match each to-be-queried-image feature in the to-be-queried-image feature library, to obtain, according to a matching result, an image matching the query image, for example, obtain an image similar to the query image, thereby achieving retrieval processing of the query image. The to-be-queried-image mapping features are obtained by performing feature mapping on the to-be-queried-image features through the trained feature evolution model. The feature mapping is performed on the to-be-queried-image features in the to-be-queried-image feature library through the trained feature evolution model, so that the to-be-queried-image feature library is optimized and updated, thereby obtaining the to-be-queried-image feature library associated with the trained feature extraction model. The optimized and updated to-be-queried-image feature library supports the trained feature extraction model for accurate image query processing.

Specifically, the server can look up the to-be-queried-image feature library associated with the historical feature extraction model. The to-be-queried-image feature library includes the respective to-be-queried-image features of the images to be queried. The to-be-queried-image features are extracted by the historical feature extraction model from the images to be queried. That is, the to-be-queried-image features in the to-be-queried-image feature library are used as image base library features for image matching through the historical feature extraction model. The server obtains the trained feature evolution model, and perform feature mapping on the to-be-queried-image features through the trained feature evolution model to obtain the respective to-be-queried-image mapping features of the images to be queried. The server updates the to-be-queried-image feature library based on the to-be-queried-image mapping features to obtain a to-be-queried-image feature library associated with the trained feature extraction model. Feature mapping is performed on the to-be-queried-image features through the trained feature evolution model to update the to-be-queried-image feature library. The to-be-queried-image mapping features in the updated to-be-queried-image feature library are suitable for use as image base library features for image matching through the trained feature extraction model. Further, after a user inputs a query image, the server may extract a feature from the query image through the trained feature extraction model, and use the extracted image feature to match a feature in the to-be-queried-image feature library associated with the trained feature extraction model, that is, perform feature matching on the extracted image feature and each of the to-be-queried-image mapping features, and an image matching the query image, such as an image that is the same as or similar to the query image, can be determined based on a feature matching result.

In this embodiment, the to-be-queried-image feature library associated with the historical feature extraction model is updated through the trained feature evolution model to obtain a to-be-queried-image feature library associated with the trained feature extraction model. In this way, the base library features can be updated directly based on the feature evolution model to achieve feature backfilling in a lightweight and efficient manner implement, thereby helping improve the quality of the base library features and improve the update processing efficiency of the to-be-queried-image feature library.

In an embodiment, as shown in FIG. 4, a feature extraction method is provided. The method is performed by a computer device, and specifically, may be a computer device such as a terminal or a server alone, or may be performed by a terminal and a server jointly. In this embodiment of this disclosure, that the method is applied to the server in FIG. 1 is used as an example for description. The method includes the following steps:

Step 402: Obtain an image to be processed.

The image to be processed is a target image on which feature extraction processing needs to be performed, and specifically, may be an image sent by a user to the server through the terminal. Specifically, the server may obtain the image to be processed on which the feature extraction processing needs to be performed.

Step 404: Perform, through a feature extraction model, feature extraction on the image to be processed to obtain a to-be-processed-image feature of the image to be processed; the feature extraction model being obtained by continuing to perform joint training after updating, based on a model compatibility loss and a classification loss of a second classification, respective model parameters of a feature extraction model to be trained and an image classification model to be trained; the model compatibility loss being obtained by performing a first classification based on a second image feature through a historical image classification model and adjusting a classification loss of the first classification through an inheritance parameter, the historical image classification model being obtained through joint training with a trained historical feature extraction model; the second image feature being extracted from a sample image through the feature extraction model to be trained; the inheritance parameter being determined based on feature discriminativeness reflected by a first image feature of the sample image; the first image feature being extracted from the sample image by the historical feature extraction model; and the classification loss of the second classification being obtained by performing the second classification based on the second image feature through the image classification model to be trained.

The feature extraction model is a pre-trained model, used for performing feature extraction on an input image, and specifically, may perform feature extraction on an input image to be processed and output a to-be-processed-image feature of the image to be processed. The to-be-processed-image feature is used for representing an image feature of the image to be processed. Based on the to-be-processed-image feature, various subsequent processing such as image matching and image classification may be performed on the image to be processed. The training processing of the feature extraction model can be implemented based on the feature extraction model processing method involved above.

Specifically, the server may obtain the pre-trained feature extraction model, and perform, through the feature extraction model, feature extraction on the image to be processed, for example, may input the image to be processed into the feature extraction model to obtain the to-be-processed-image feature of the image to be processed. Further, when pre-training the feature extraction model, the server may obtain the sample image and the inheritance parameter of the sample image. The inheritance parameter of the sample image is determined based on the feature discriminativeness reflected by the first image feature after the server extracts the first image feature from the sample image through the trained historical feature extraction model in advance. The server performs feature extraction on the sample image through the feature extraction model to be trained to obtain the second image feature of the sample image. The server performs the first classification based on the second image feature through the trained historical image classification model to obtain the classification loss of the first classification, and adjusts the classification loss of the first classification through the inheritance parameter to obtain the model compatibility loss. The server performs, through the image classification model jointly trained with the feature extraction model to be trained, the second classification based on the second image feature extracted by the feature extraction model to be trained to obtain the classification loss of the second classification. The server updates, according to the model compatibility loss and the classification loss of the second classification, new models including the feature extraction model to be trained and the image classification model to be trained, and continues to perform joint training after the models are updated, that is, performs joint training by using a next sample image, until the training is completed, to obtain the trained feature extraction model. The trained feature extraction model may perform feature extraction on the input image and output an image feature for representing the input image.

In the feature extraction method, feature extraction is performed on the image to be processed through the pre-trained feature extraction model. However, in the training process of the feature extraction model, the first classification is performed, through the historical image classification model obtained through joint training with the historical feature extraction model, based on the second image feature extracted from the sample image by the feature extraction model to be trained, and the classification loss of the first classification is adjusted through the inheritance parameter to obtain the model compatibility loss. The inheritance parameter is obtained based on the feature discriminativeness reflected by the first image feature extracted from the sample image by the historical feature extraction model. The second classification is performed based on the second image feature through the image classification model to be trained. Model update training is performed based on the model compatibility loss and the classification loss of the second classification. In this way, the features extracted by the historical feature extraction model may be selectively inherited through the inheritance parameter determined based on the features extracted by the historical feature extraction model. In this way, the knowledge of the historical feature extraction model can be effectively learned, so that the feature extraction model obtained through training can improve the effectiveness of image feature extraction while ensuring model compatibility with the historical feature extraction model.

In an embodiment, the feature extraction method further includes: determining a to-be-queried-image feature library; using the to-be-processed-image feature to match a feature in the to-be-queried-image feature library to obtain a to-be-queried-image feature matching the to-be-processed-image feature; determining, according to an image associated with the to-be-queried-image features, an image query result for the image to be processed.

The to-be-queried-image feature library includes respective to-be-queried-image features of the images to be queried. The to-be-queried-image features are obtained by performing, by the feature extraction model, feature extraction on the images to be queried. After obtaining the trained feature extraction model, the server may perform, through the feature extraction model, feature extraction on the images to be queried, and aggregate the extracted to-be-queried-image features to construct a to-be-queried-image feature library. Image query processing can be achieved by performing feature matching based on the to-be-queried-image features.

Specifically, the server determines the to-be-queried-image feature library. The to-be-queried-image feature library is associated with the feature extraction model and is suitable for image query processing based on the image features extracted by the feature extraction model. The server uses the to-be-processed-image feature to match a feature in the to-be-queried-image feature library, and specifically, may use the to-be-processed-image feature to match each of the to-be-queried-image features in the to-be-queried-image feature library. For example, a feature similarity between the to-be-processed-image feature and the to-be-queried-image feature may be determined. The server may determine, based on a feature matching result, a to-be-queried-image feature matching the to-be-processed-image feature. For example, a to-be-queried-image feature with a similarity greater than a similarity threshold may be determined as a to-be-queried-image feature matching the to-be-processed-image feature. The server determines an image associated with the to-be-queried-image feature, and determines, based on the image associated with the to-be-queried-image feature, an image query result for the image to be processed. For example, the server may use the image associated with the to-be-queried-image feature matching the to-be-processed-image feature as an image matching the image to be processed and return the image, thereby obtaining the image query result for the image to be processed.

In this embodiment, the pre-trained feature extraction model extracts a to-be-processed-image feature of the image to be processed. The to-be-processed-image feature is used to match a feature in the to-be-queried-image feature library. Based on an image associated with the matching to-be-queried-image feature, an image query result for the image to be processed is determined. In this way, the accuracy of image query can be improved.

This disclosure further provides an application scenario. The foregoing feature extraction model processing method and feature extraction method are applied to the application scenario. Specifically, the application of the feature extraction model processing method and the feature extraction method in the application scenario is as follows:

The server may construct sample images, and the sample images may be divided into different categories. The server performs, through the historical image classification model obtained through joint training with the historical feature extraction model, the first classification based on the second image feature extracted from the received sample image by the feature extraction model to be trained, and adjusts the classification loss of the first classification through the inheritance parameter to obtain the model compatibility loss. The inheritance parameter is obtained based on the feature discriminativeness reflected by the first image feature extracted from the sample image by the historical feature extraction model. The server performs the second classification based on the second image feature through the image classification model to be trained, and performs model update training based on the model compatibility loss and the classification loss of the second classification, until the training ends, to obtain the trained feature extraction model. Further, the server may receive an image to be classified sent by the terminal. The server may extract, through the trained feature extraction model, a feature from the image to be classified, and perform, through a classifier, image classification on the extracted image feature of the image to be classified, to determine an image category to which the image to be classified belongs, such as a landscape image or a portrait image.

This application further provides an application scenario. The foregoing feature extraction model processing method and feature extraction method are applied to the application scenario. Specifically, the application of the feature extraction model processing method and the feature extraction method in the application scenario is as follows:

An image retrieval system generally includes a feature extractor or model and a database that stores features of massive base library pictures. When a user inputs a query picture for search, the image retrieval system extracts a feature of the query picture by using the feature extractor, performs similarity comparison in the existing database, and then returns a picture that is the same as or similar to the query picture to the user, thereby achieving query processing of the input picture. For the image retrieval system, a conventional model upgrade paradigm needs to use a new model to re-update all base library features before deploying the new model, which is referred to as feature backfilling. Considering the billions of pictures in the industry, the feature backfilling processing is extremely time-consuming and expensive. Further, feature backfilling can be avoided based on a backward-compatible model upgrade paradigm. Specifically, additional constraints compatible with the old model feature is introduced during training of the new model. However, there is still a dilemma: the new model requires a balance between model discriminativeness of the new model and the compatibility between the new and old models due to the undifferentiated compatibility constraint training. A new paradigm of Darwinian Model Upgrades (DMU) proposed in this embodiment decouples inheritance and evolution stages in a model upgrade process. The inheritance of old features is achieved through selective backward compatibility training, and the evolution of old features is achieved through a lightweight forward evolution branch. Detailed and substantial experimental verification on large-scale image retrieval data sets, including landmark retrieval data sets and face recognition data sets, shows that the feature extraction model processing method and the feature extraction method proposed in this embodiment can effectively alleviate the loss of discriminativeness of the new model and can improve the compatibility between the new and old models.

In backward-compatible training (BCT, Backward-Compatible representation learning), an influence loss function is introduced in the training of a new model, to guide new features to approach a class center of old features. A parameter of an old classifier is used as a reference for the old class center. The backward-compatible training can meet a preliminary compatibility performance requirement, but the new model needs to sacrifice discriminativeness thereof to ensure the compatibility with the old model. To resolve the dilemma of the trade-off between the discriminativeness of the new model and the compatibility between the new and old models in the existing compatibility method, this embodiment proposes a new paradigm of DMU. The paradigm decouples the inheritance and evolution stages in the model upgrading process. The inheritance of old features is achieved through selective backward compatibility training, and the evolution of old features is achieved through a lightweight forward evolution branch.

Figure 6:
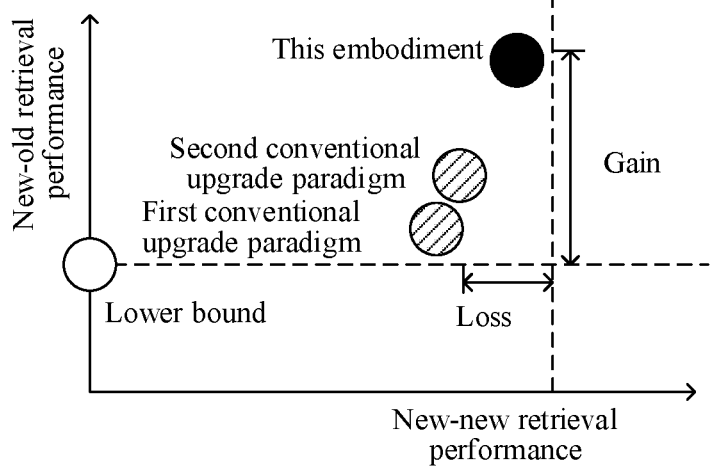
FIG. 6 is a schematic comparative diagram of effects of different model upgrade paradigms according to an embodi-ment.

Further, as shown in FIG. 5, the drawing (a) on the left shows that the model upgrade paradigm based on backward compatibility inherits old features in an undifferentiated manner and faces the dilemma that the new model discriminativeness capability and the new-old compatibility cannot be both achieved. That is, to be effectively compatible with the old model, a new class center formed after new features are added has a low correlation with new features. Consequently, the discriminativeness of the new model is affected and effective image features cannot be extracted. The drawing (b) on the right shows the DMU in this embodiment. This paradigm inherits good old features through selective backward compatibility and updates poor old features. In this way, the previously existing dilemma can be effectively avoided. Specifically, feature evolution is performed on the old features and adjustment is performed through compatibility weights, so that the new class center formed after the new features are added has a higher correlation with the new features. As shown in the drawing (b), the new features are closer to the new class center, so that the loss of the discriminativeness of the new model can be effectively alleviated, and the compatibility between the new and old models can also be improved. During specific application, as shown in FIG. 6, an experimental result on a landmark retrieval data set Google Landmark shows that compared with a first conventional upgrade paradigm (BCT (CVPR'20)) and a second conventional upgrade paradigm (UniBCT(IJCAI'22)), this embodiment has higher gains and lower losses, that is, not only can effectively alleviate the problem of the loss of the discriminativeness of the new model, but also can further improve the compatibility between the new and old models.

Specifically, the feature extraction model processing method and the feature extraction method provided in this embodiment propose a new problem of universal backward compatible representation learning, propose a unified backward compatible training paradigm, and achieve the optimal performance in various real compatible training scenarios. The new paradigm of DMU provided in this embodiment can effectively alleviate the problem of degradation of the discriminativeness of the new model caused by backward compatibility, and can further improve the performance of the compatibility between the new and old models, thereby making the upgrade of the retrieval model more efficient and reducing the upgrade costs in the industry.

In an image retrieval scenario, a query picture (denoted as Q) is given. Picture retrieval means that pictures with the same content or object can be correctly retrieved from a large-scale candidate picture gallery (denoted as G). D represents a training data set, and $\varphi$ represents a model. A feature of any picture $x \in D$ in a new training data set that is extracted by a new model, that is, a newly trained feature extraction model, may be represented as $\varphi_n(x)$. In this embodiment, a classification task in the form of ArcFace loss function is selected as a prerequisite task. If a label corresponding to the picture x is y, the loss function may be expressed as the following formula (1):

$$l_{arc}(x; \varphi, \omega) = -\log \frac{e^{s \cdot k(\varphi(x), \omega(y), m)}}{e^{s \cdot k(\varphi(x), \omega(y), m)} + \sum_{j \neq y} e^{s \cdot k(\varphi(x), \omega(j), 0)}} \quad (1)$$

where $\varphi(x)$ is a feature extracted by the model; $\omega(y)$ is a weight value in a classifier corresponding to a category, and a result of multiplying $\varphi(x)$ and $\omega(y)$ represents a value of the probability that x belongs to the category y, that is, represents a classification result; m is a hyperparameter, representing a spacing between angles; s is a scaling factor; and $\varphi$ represents the classifier. A kernel function is defined as $k(\varphi(x), \omega(y), m) = \cos(\arccos \langle \varphi(x), \omega(y) \rangle + m)$, and $\langle \cdot, \cdot \rangle$ represents an inner product of a vector.

Further, for model upgrade processing based on backward compatibility, the performance of the retrieval system is denoted as $M(\cdot, \cdot)$, and a new picture feature extractor and an old picture feature extractor are denoted as $\varphi_n$ and $\varphi_o$, respectively. The model upgrade based on backward compatibility improves retrieval performance by improving features of the query picture. A specific target is shown in the following formula (2):

$$M(\varphi_o(Q), \varphi_o(G)) < M(\varphi_n(Q), \varphi_n(G)) \quad (2)$$

To simplify the expression, Q and G may be omitted in sequence to simplify $M(\varphi_o(Q), \varphi_o(G))$ to $M(\varphi_o,\varphi_o)$.

A performance gain $\Delta_{\triangledown}$ is defined as shown in the following formula (3):

$$\Delta_{\uparrow} = \frac{M(\varphi_n, \varphi_n) - M(\varphi_o, \varphi_o)}{M(\varphi_o, \varphi_o)} \tag{3}$$

A discriminativeness loss $\Delta_{\downarrow}$ is defined as shown in the following formula (4):

$$\Delta_{\downarrow} = \frac{M(\varphi_n^{oracle}, \varphi_n^{oracle}) - M(\varphi_n, \varphi_n)}{M(\varphi_n^{oracle}, \varphi_n^{oracle})} \tag{4}$$

where $\varphi_n^{oracle}$ where $$\varphi_n^{oracle}$$

represents a pure model without compatibility constraints.

Figure 7:
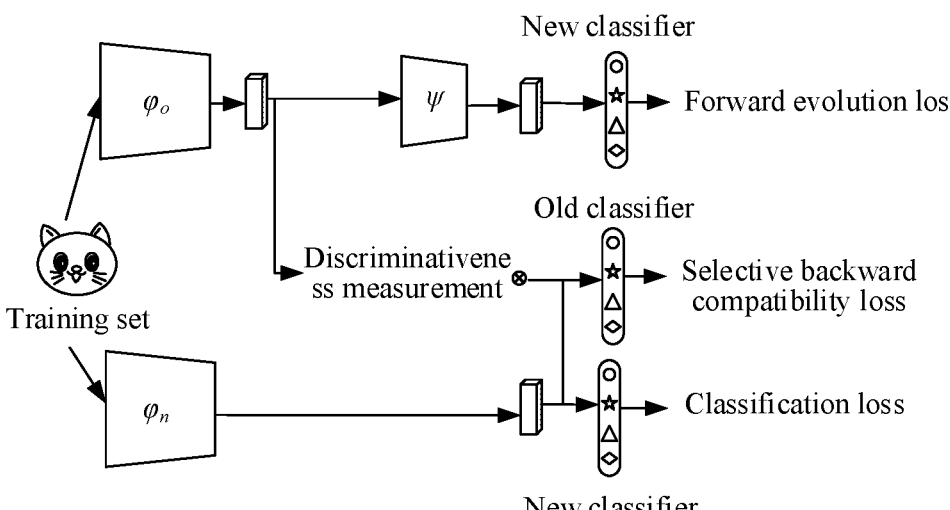
FIG. 7 is a schematic structural diagram of a feature extraction model according to an embodiment.
Figure 8:
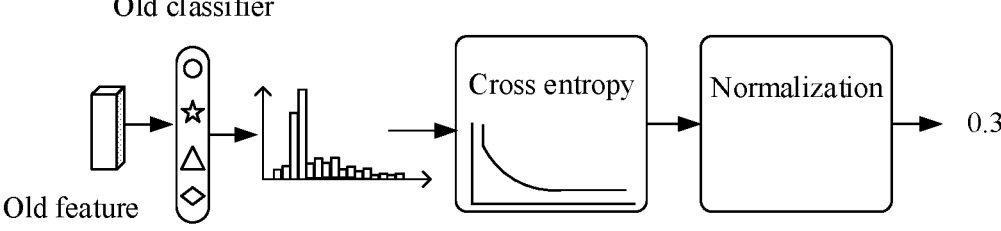
FIG. 8 is a schematic flowchart of discriminativeness measurement according to an embodiment.

Specifically, the paradigm of DMU proposed in this embodiment includes a backward-compatible new model ($\varphi_n$) and a lightweight forward evolution branch ($\psi$), as shown in FIG. 7. For the same sample set, feature extraction is performed through new and old feature extraction models, respectively. For old features extracted by the old feature extraction model, on the one hand, feature mapping is performed through the forward evolution branch to evolve the old features, and then classification processing is performed through a new classifier to obtain a forward evolution loss. On the other hand, discriminativeness of the old features is measured to determine an inheritance weight of each sample image, and new features extracted by the new feature extraction model are classified through an old classifier based on the inheritance weight to obtain a selective backward compatibility loss. For the processing of discriminativeness measurement, as shown in FIG. 8, after the features extracted by the old feature extraction model are classified by the old classifier, a probability distribution corresponding to each category is obtained. A cross entropy is calculated based on the probability distribution and normalization is performed to construct an inheritance weight corresponding to the sample image. For example, the inheritance weight may be 0.3. The new features extracted by the feature extraction model are classified through a new split period to obtain a classification loss. A sum of the forward evolution loss, the selective backward compatibility loss, and the classification loss is used as an overall target of training.

To resolve the dilemma between the performance gain and the discriminativeness loss, good old knowledge can be inherited through selective backward compatibility training, and the old features are evolved toward a better feature latent space through the forward evolution branch. An overall training target arg $\min_{\varphi_n, \psi}$ of the DMU can be expressed as shown in the following formula (5):

$$\arg\min_{\varphi_n, \Psi} = (L_{new} + L_{SBC} + L_{FA}) \tag{5}$$

where $L_{new}$ represents the selective backward compatibility loss, $L_{SBC}$ represents the forward evolution loss, and $L_{FA}$ represents a classification loss function.

For the classification loss, within each batch (denoted as B), a discriminativeness loss function of the new model is expressed as shown in the following formula (6):

$$L_{new} = \frac{1}{|B|} \sum_{x \in B} l_{arc}(x; \varphi_n, \omega_n) \tag{6}$$

For selective backward compatibility processing, a main factor causing the loss of the discriminativeness of the new model is the undifferentiated compatibility constraint, in which the model needs to inherit both good and poor old knowledge. The foregoing problem can be alleviated by reassigning a weight to a backward compatibility target. Specifically, the discriminativeness of the feature is measured by using an entropy, which is defined as shown in the following formula (7):

$$\Lambda(x; \varphi, \omega) = \sum_{i \in |B|} -p_i(x)\log p_i(x)$$

$$p_i(x) = \frac{e^{\langle \varphi(x), \omega(i) \rangle}}{\sum_j e^{\langle \varphi(x), \omega(j) \rangle}}, \sum_{i \in |C|} p_i(x) = 1 \tag{7}$$

where $|C|$ represents the number of categories, $\omega$ represents the classifier, $p_i(x)$ is a probability distribution of each category, and a discriminativeness parameter $\Lambda$ is inversely proportional to feature discriminativeness. To alleviate the negative impact of the poor old knowledge, inheritance weights of poor samples can be reduced while inheritance weights of good samples are increased. The selective backward compatibility loss may be defined as shown in the following formula (8):

$$L_{SBC} = \sum_{x \in B} \lambda(x) l_{arc}(x; \varphi_n, \omega_o) \tag{8}$$

$$\lambda(x) = \frac{1 - \text{softmax} \ [\Lambda(x; \varphi_o, \omega_o)]}{|B| - 1}, \sum_{x \in B} \lambda(x) = 1$$

where $\lambda(x)$ is the inheritance weight of the sample image.

For the forward evolution loss, a lightweight forward evolution branch ($\psi$) is designed, so that the old features evolve toward a better feature latent space, which is defined as shown in the following formula (9):

$$L_{FA} = \frac{1}{|B|} \sum_{x \in B} l_{arc}(x; \psi(\varphi_o), \omega_n) \tag{9}$$

Figures 9, 10:
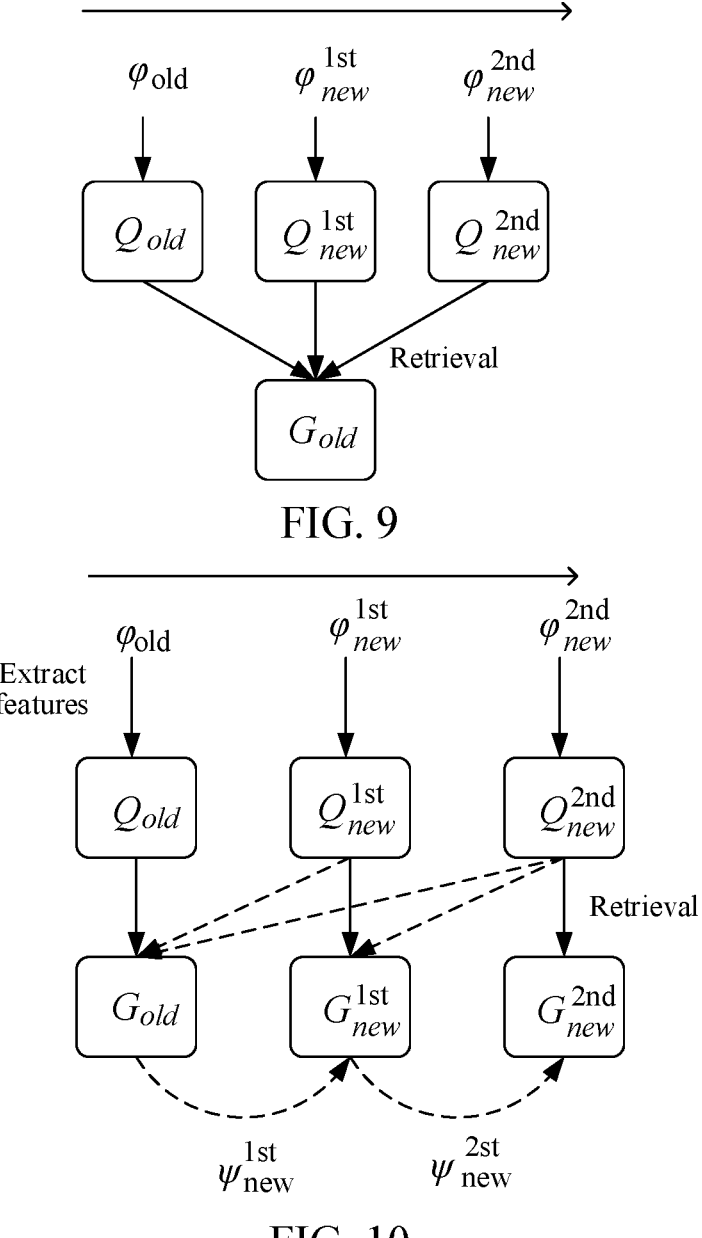
FIG. 9 is a schematic diagram of feature changes in backward-compatible sequential model upgrades according to an embodiment.
FIG. 10 is a schematic diagram of feature changes in feature extraction model processing according to an embodi-ment.

Further, as shown in FIG. 9, in the sequential model upgrade based on backward compatibility, in a process of updating a feature extraction model from an old model $\varphi_{old}$ to a first-generation new model $$\varphi_{new}^{1st}$$

and a second-generation new model $$\varphi_{new}^{2nd},$$

the features extracted from the query image change from $$Q_{old} \text{ to } Q_{new}^{1st} \text{ and } Q_{new}^{2nd}.$$

However, base library features are still base library features $G_{old}$ of the old model and do not change accordingly. In the paradigm of DMU provided in this embodiment, as shown in FIG. 10, in a process of updating a feature extraction model from an old model $\varphi_{old}$ to a first-generation new model $$\varphi_{new}^{1st}$$

and a second-generation new model $$\varphi_{new}^{2nd},$$

the features extracted from the query image change from $$Q_{old} \text{ to } Q_{new}^{1st} \text{ and } Q_{new}^{2nd},$$

and base library features change accordingly, specifically, from old base library features $G_{old}$ to first-generation base library features $$G_{new}^{1st}$$

under the action of $$\psi_{new}^{1st},$$

and from the first-generation base library features $$G_{new}^{1st}$$

to second-generation base library features $$G_{new}^{2nd}$$

under the action of $$\psi_{new}^{2st}.$$

The features extracted from the query image can be compatible with base library features of old versions. That is, the paradigm of DMU provided in this embodiment can improve the quality of query features through the new model obtained through selective backward compatibility training, and improve the quality of the base library features through the forward upgrade branch.

During specific application, the paradigm of DMU proposed in this embodiment can well alleviate the loss of discriminativeness of the new model caused by compatibility training and can further improve the compatibility between the new and old models, so that the paradigm can be used in wider fields. The paradigm of DMU provided in this embodiment is verified on a plurality of large-scale image retrieval data sets: Google Landmark, Revisited Oxford, Revisited Paris, MS1Mv3, and IJB-C.

During verification, regarding the setting of evaluation indicators, for landmark retrieval tasks (including three data sets: Google Landmark, Revisited Oxford, and Revisited Paris), a value of mean average precision (mAP) is used for measurement. For face recognition tasks (including face recognition data sets MS1Mv3 and IJB-C), true acceptance rates (TARs) under different false acceptance rates (FARs) can be calculated for different template pairs, abbreviated as TAR@FAR.

Experimental results of the verification are shown in the following Table 1 and Table 2. This embodiment exceeds the existing method in different compatibility scenarios, not only alleviates the degree of loss of the discriminativeness of the new model, but also improves the compatibility performance between the new and old model retrieval. The experimental results confirm the effectiveness of this embodiment.

TABLE 1

| Training scheme scenario | Training method method | Data set 1 (GLDv2-test) | | | | Data set 2 (roxford) | | | | Data set 3 (Rparis) | | | |
|---|---|---|---|---|---|---|---|---|---|---|---|---|---|
| | | M $(\varphi n, \varphi n)$ | M $(\varphi n, \varphi o)$ | $\Delta\uparrow$ | $\Delta\downarrow$ | M $(\varphi n, \varphi n)$ | M $(\varphi n, \varphi o)$ | $\Delta\uparrow$ | $\Delta\downarrow$ | M $(\varphi n, \varphi n)$ | M $(\varphi n, \varphi o)$ | $\Delta\uparrow$ | $\Delta\downarrow$ |
| 30% data | $\phi_o^{ir\ 18}$ | 18.93 | — | — | — | 64.33 | — | — | — | 82.94 | — | — | — |
| $\rightarrow$ | $\phi_n^{ir\ 18}$ (oracle) | 25.58 | — | — | — | 75.88 | — | — | — | 86.09 | — | — | — |
| 100% data | $\phi_n^{ir\ 18}$ (BCT) | 25.55 | 21.12 | 11.57 | 4.03 | 73.74 | 64.75 | 0.65 | 2.82 | 85.73 | 85.53 | 0.71 | 0.42 |

TABLE 1-continued

| Training scheme scenario | Training method method | Data set 1 (GLDv2-test) | | | | Data set 2 (roxford) | | | | Data set 3 (Rparis) | | | |
|---|---|---|---|---|---|---|---|---|---|---|---|---|---|
| | | M ($\varphi$n, $\varphi$n) | M ($\varphi$n, $\varphi$o) | Δ↑ | Δ↓ | M ($\varphi$n, $\varphi$n) | M ($\varphi$n, $\varphi$o) | Δ↑ | Δ↓ | M ($\varphi$n, $\varphi$n) | M ($\varphi$n, $\varphi$o) | Δ↑ | Δ↓ |
| | $\phi_n^{ir\ 18}$ (this embodiment) | 24.55 | 22.56 | 19.18 | 2.27 | 74.07 | 66.68 | 3.65 | 2.39 | 85.73 | 84.48 | 1.86 | −0.58 |
| 30% data | $\phi_o^{ir\ 18}$ | 25.00 | — | — | — | 64.33 | — | — | — | 86.59 | — | — | — |
| → | $\phi_n^{ir\ 18}$ (oracle) | 18.93 | — | — | — | 72.20 | — | — | — | 82.94 | — | — | — |
| 70% data | $\phi_n^{ir\ 18}$ (BCT) | 23.66 | 20.74 | 9.56 | 0.80 | 72.91 | 63.73 | −0.93 | −0.98 | 86.64 | 83.4 | 0.55 | 0.23 |
| | $\phi_n^{ir\ 18}$ (this embodiment) | 23.47 | 21.70 | 14.63 | −0.42 | 73.01 | 64.14 | −0.30 | −1.12 | 86.44 | 84.64 | 2.05 | 0.85 |
| 30% data | $\phi_o^{ir\ 18}$ | 17.53 | — | — | — | 70.07 | — | — | — | 85.90 | — | — | — |
| → | $\phi_n^{ir\ 18}$ (oracle) | 25.58 | — | — | — | 75.88 | — | — | — | 83.62 | — | — | — |
| 100% data | $\phi_n^{ir\ 18}$ (BCT) | 25.10 | 24.39 | 39.13 | 1.88 | 73.99 | 73.34 | 4.67 | 2.49 | 85.09 | 83.67 | 0.42 | 0.54 |
| | $\phi_n^{ir\ 18}$ (this embodiment) | 24.45 | 25.01 | 42.67 | 0.51 | 74.13 | 73.78 | 5.29 | 2.31 | 86.64 | 84.52 | 1.08 | −0.64 |
| resent50 | $\phi_o^{ir\ 18}$ | 18.93 | — | — | — | 64.33 | — | — | — | 82.94 | — | — | — |
| → | $\phi_n^{ir\ 18}$ (oracle) | 27.42 | — | — | — | 75.89 | — | — | — | 86.62 | — | — | — |
| resent101 | $\phi_n^{ir\ 18}$ (BCT) | 25.56 | 21.68 | 14.53 | 6.78 | 75.7 | 66.12 | 2.78 | 0.25 | 87.35 | 85.59 | 3.20 | −0.84 |
| | $\phi_n^{ir\ 18}$ (this embodiment) | 25.92 | 22.38 | 18.23 | 5.47 | 76.49 | 66.35 | 3.14 | −0.79 | 88.08 | 85.93 | 3.61 | −1.69 |

Specifically, in comparison of the performance of the paradigm of DMU provided in this embodiment and that of a baseline model (BCT) in different compatibility scenarios, oracle is a pure model without compatibility constraints, and a test set is a landmark retrieval data set (Google Landmark, ROxford, or RParis). Table 1 simulates four different compatibility scenarios. (1) 30% data→100% data means that the old model uses 30% of the data for training, and the new model uses 100% of the data for compatibility training of the old model. (2) 30% data→70% data means that the new model uses 70% of the data (which does not overlap the old training data set, but shares categories) for compatibility training of the old model. (3) 30% class→100% class means that the old model uses 30% of categories for training, and the new model uses all categories for compatibility training of the old model. (4) resnet50→resnet101 means that the old model uses ResNet50 as a backbone network and 30% of the data for training, while the new model uses ResNet101 as a backbone network and 100% of the data for the compatibility training of the old model.

| Training scheme scenario | Training method method | Data set verification (IJB-C) | | | |
|---|---|---|---|---|---|
| | | M ($\varphi$n, $\varphi$n) | M ($\varphi$n, $\varphi$o) | Δ↑ | Δ↓ |
| 30% data | $\phi_o^{ir\ 18}$ | 91.67 | — | — | — |
| → | $\phi_n^{ir\ 18}$ (oracle) | 93.89 | — | — | — |
| 100% data | $\phi_n^{ir\ 18}$ (BCT) | 93.96 | 92.82 | 1.25 | −0.07 |
| | $\phi_n^{ir\ 18}$ (this embodiment) | 94.17 | 92.96 | 1.41 | −0.30 |
| 30% data | $\phi_o^{ir\ 18}$ | 91.67 | — | — | — |
| → | $\phi_n^{ir\ 18}$ (oracle) | 93.79 | — | — | — |
| 100% data | $\phi_n^{ir\ 18}$ (BCT) | 93.96 | 92.61 | 1.03 | 0.11 |

-continued

| Training | Training | Data set verification (IJB-C) | | | |
|---|---|---|---|---|---|
| scheme scenario | method method | M (φn, φn) | M (φn, φo) | Δ↑ | Δ↓ |
| $\phi_n^{ir\ 18}$ (this embodiment) | | 93.96 | 92.77 | 1.20 | −0.18 |

Specifically, in a test set of the face recognition data set, the paradigm of DMU provided in this embodiment can alleviate the degree of loss of the discriminativeness of the new model and improve the compatibility performance between the new and old model retrieval.

It is to be understood that, although the steps are displayed sequentially according to the instructions of the arrows in the flowcharts involved in the embodiments described above, these steps are not necessarily performed sequentially according to the sequence instructed by the arrows. Unless otherwise explicitly specified in this disclosure, execution of the steps is not strictly limited, and the steps may be performed in other sequences. Moreover, at least some of the steps in the flowcharts involved in the embodiments described above may include a plurality of sub-steps or a plurality of stages. The sub-steps or stages are not necessarily performed at the same moment but may be performed at different moments. The sub-steps or stages are not necessarily sequentially performed, but may be performed successively or alternately with other steps or at least some of sub-steps or stages of other steps.

Based on the same inventive concept, an embodiment of this disclosure further provides a feature extraction model processing apparatus for implementing the feature extraction model processing method involved above. The solution provided by the apparatus for resolving the problem is similar to the solution described in the foregoing method. Therefore, for specific limitations in one or more feature extraction model processing apparatus embodiments provided below, refer to the limitations on the feature extraction model processing method in the foregoing descriptions. Details are not described herein again.

Figure 11:
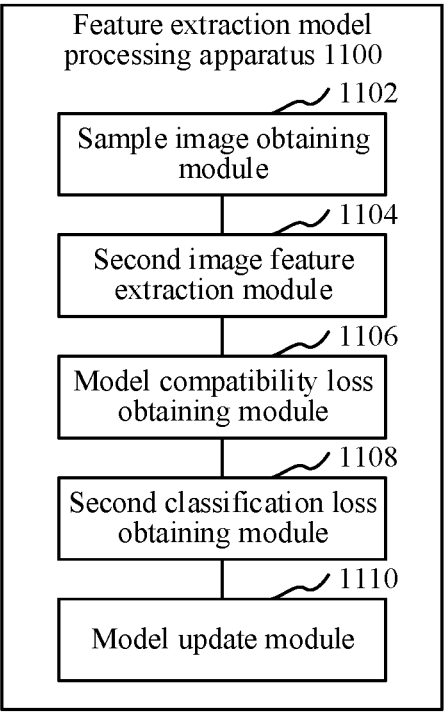
FIG. 11 is a structural block diagram of a feature extrac-tion model processing apparatus according to an embodi-ment.

In an embodiment, as shown in FIG. 11, a feature extraction model processing apparatus 1100 is provided, including: a sample image obtaining module 1102, a second image feature extraction module 1104, a model compatibility loss obtaining module 1106, a second classification loss obtaining module 1108, and a model update module 1110.

The sample image obtaining module 1102 is configured to obtain a sample image and an inheritance parameter of the sample image, the inheritance parameter being determined based on feature discriminativeness reflected by a first image feature of the sample image, and the first image feature being extracted from the sample image by a trained historical feature extraction model.

The second image feature extraction module 1104 is configured to extract a second image feature from the sample image through a feature extraction model to be trained.

The model compatibility loss obtaining module 1106 is configured to perform a first classification based on the second image feature through a historical image classification model obtained through joint training with the historical feature extraction model to obtain a classification result of the first classification, determine a classification loss of the first classification according to the classification result of the first classification, and adjust the classification loss of the first classification through the inheritance parameter to obtain a model compatibility loss.

The second classification loss obtaining module 1108 is configured to perform a second classification based on the second image feature through an image classification model to be trained to obtain a classification result of the second classification, and obtain a classification loss of the second classification according to the classification result of the second classification.

The model update module 1110 is configured to update, based on the model compatibility loss and the classification loss of the second classification, respective model parameters of the feature extraction model to be trained and the image classification model to be trained, and then continue to perform joint training to obtain a trained feature extraction model.

In an embodiment, the apparatus further includes a first image feature extraction module, a category distribution obtaining module, and an inheritance parameter determining module. The first image feature extraction module is configured to extract the first image feature from the sample image through the historical feature extraction model. The category distribution obtaining module is configured to perform an image classification on the first image feature through the historical image classification model to obtain an image category classification result. The inheritance parameter determining module is configured to determine the inheritance parameter of the sample image according to the image category classification result.

In an embodiment, the inheritance parameter determining module includes a cross entropy determining module, a normalization processing module, and a discriminativeness parameter processing module. The cross entropy determining module is configured to determine a category cross entropy parameter based on the image category classification result. The normalization processing module is configured to normalize the category cross entropy parameter to obtain a discriminativeness parameter, the discriminativeness parameter being used for measuring the feature discriminativeness of the first image feature. The discriminativeness parameter processing module is configured to determine the inheritance parameter of the sample image according to the discriminativeness parameter.

In an embodiment, the inheritance parameter includes an inheritance weight, and there is a positive correlation between a value of the inheritance weight and a metric value of the feature discriminativeness. The model compatibility loss obtaining module 1106 is further configured to weight the classification loss of the first classification according to the inheritance weight to obtain the model compatibility loss.

In an embodiment, the model compatibility loss obtaining module 1106 is further configured to determine the historical image classification model obtained through joint training with the historical feature extraction model and a category label of the sample image; determine, based on the category label, a historical classification model parameter of the historical image classification model for a category to which the sample image belongs; and obtain the classification result of the first classification according to the second image feature and the historical classification model parameter.

In an embodiment, the model compatibility loss obtaining module 1106 is further configured to obtain the classification loss of the first classification based on an angle interval between the second image feature and the historical classification model parameter in the classification result of the first classification.

In an embodiment, the model compatibility loss obtaining module 1106 is further configured to determine the classification loss of the first classification based on a difference between the classification result of the first classification and the category label of the sample image.

In an embodiment, the second classification loss obtaining module 1108 is further configured to perform the second classification based on the second image feature through the image classification model to be trained to obtain the classification result of the second classification; and determine the classification loss of the second classification based on a difference between the classification result of the second classification and the category label carried by the sample image.

In an embodiment, a model update module 1110 is further configured to obtain a loss in training according to a sum of the model compatibility loss and the classification loss of the second classification; and update, based on the loss in the training, the respective model parameters of the feature extraction model to be trained and the image classification model to be trained, and then continue to perform joint training, until a training end condition is met, and end the training to obtain the trained feature extraction model.

In an embodiment, the apparatus further includes a feature mapping module and a third classification module. The feature mapping module is configured to perform feature mapping on the first image feature through a feature evolution model to be trained to obtain a mapping feature of the first image feature. The third classification module is configured to perform a third classification based on the mapping feature through the image classification model to be trained to obtain a classification result of the third classification, and obtain a classification loss of the third classification according to the classification result of the third classification. The model update module 1110 is further configured to update, based on the model compatibility loss, the classification loss of the second classification, and the classification loss of the third classification, respective model parameters of the feature extraction model to be trained, the image classification model to be trained, and the feature evolution model to be trained, and then continue to perform joint training to obtain the trained feature extraction model.

In an embodiment, the model update module 1110 is further configured to obtain a target loss of the joint training according to the model compatibility loss, the classification loss of the second classification, and the classification loss of the third classification; and update, based on the target loss, the respective model parameters of the feature extraction model to be trained, the image classification model to be trained, and the feature evolution model to be trained, and then continue to perform the joint training.

In an embodiment, the model update module 1110 is further configured to obtain the target loss of the joint training according to a sum of the model compatibility loss, the classification loss of the second classification, and the classification loss of the third classification.

In an embodiment, the apparatus further includes a feature library determining module, a feature library feature mapping module, and a feature library update module. The feature library determining module is configured to determine a to-be-queried-image feature library associated with the historical feature extraction model, the to-be-queried-image feature library including respective to-be-queriedimage features of images to be queried, and the to-be-queried-image features being extracted by the historical feature extraction model from the images to be queried. The feature library feature mapping module is configured to perform feature mapping on the to-be-queried-image features through a trained feature evolution model to obtain respective to-be-queried-image mapping features of the images to be queried. The feature library update module is configured to update the to-be-queried-image feature library based on the to-be-queried-image mapping features to obtain a to-be-queried-image feature library associated with the trained feature extraction model.

Based on the same inventive concept, an embodiment of this disclosure further provides a feature extraction apparatus for implementing the feature extraction method involved above. The solution provided by the apparatus for resolving the problem is similar to the solution described in the foregoing method. Therefore, for specific limitations in one or more feature extraction apparatus embodiments provided below, refer to the limitations on the feature extraction method in the foregoing descriptions. Details are not described herein again.

Figure 12:
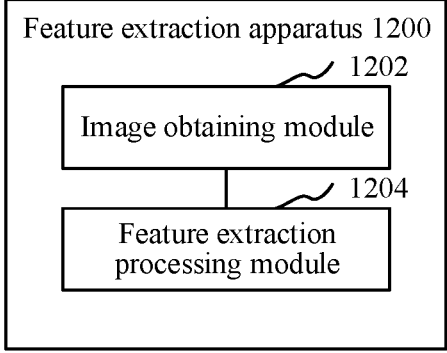
FIG. 12 is a structural block diagram of a feature extrac-tion apparatus according to an embodiment.

In an embodiment, as shown in FIG. 12, a feature extraction apparatus 1200 is provided, including: an image obtaining module 1202 and a feature extraction processing module 1204.

The image obtaining module 1202 is configured to obtain an image to be processed.

The feature extraction processing module 1204 is configured to perform, through a feature extraction model, feature extraction on the image to be processed to obtain a to-be-processed-image feature of the image to be processed.

The feature extraction model is obtained by continuing to perform joint training after updating, based on a model compatibility loss and a classification loss of a second classification, respective model parameters of a feature extraction model to be trained and an image classification model to be trained. The model compatibility loss is obtained by performing a first classification based on a second image feature through a historical image classification model and adjusting a classification loss of the first classification through an inheritance parameter, the historical image classification model being obtained through joint training with a trained historical feature extraction model. The second image feature is extracted from a sample image through the feature extraction model to be trained. The inheritance parameter is determined based on feature discriminativeness reflected by a first image feature of the sample image. The first image feature being extracted from the sample image by the historical feature extraction model. The classification loss of the second classification is obtained by performing the second classification based on the second image feature through the image classification model to be trained.

In an embodiment, the apparatus further includes a feature library determining module, a feature matching module, and a query result determining module. The feature library determining module is configured to determine a to-be-queried-image feature library. The feature matching module is configured to use the to-be-processed-image feature to match a feature in the to-be-queried-image feature library to obtain a to-be-queried-image feature matching the to-be-processed-image feature. The query result determining module is configured to determine, according to an image associated with the to-be-queried-image features, an image query result for the image to be processed.

All or some of the modules in the feature extraction model processing apparatus and the feature extraction apparatus described above may be implemented through software, hardware, or a combination thereof. The modules may be embedded in or independent of a processor of a computer device in a form of hardware, or stored in a memory of the computer device in a form of software, so that the processor can easily invoke and perform corresponding operations of the modules.

In an embodiment, a computer device is provided. The computer device may be a server or a terminal, and a diagram of an internal structure thereof may be shown in FIG. 13. The computer device includes a processor, a memory, an input/output (I/O) interface, and a communication interface. The processor, the memory, and the I/O interface are connected through a system bus. The communication interface is connected to the system bus through the I/O interface. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for the running of the operating system and the computer-readable instructions in the non-volatile storage medium. The database of the computer device is configured to store various model data. The I/O interface of the computer device is configured for information exchange between the processor and an external device. The communication interface of the computer device is configured to communicate with an external terminal through a network connection. The computer-readable instructions are executed by the processor to implement at least one of a feature extraction model processing method or a feature extraction method.

Figure 13:
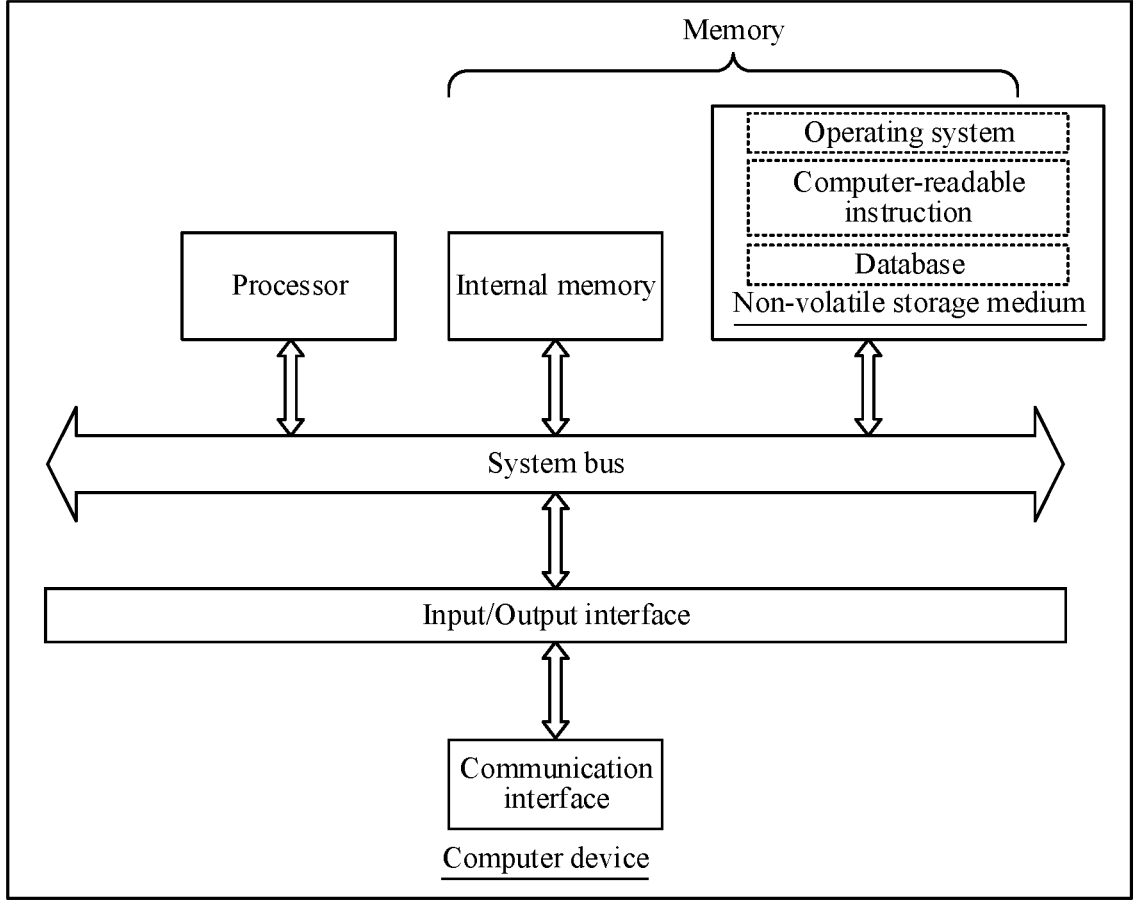
FIG. 13 is a diagram of an internal structure of a computer device according to an embodiment.

A person skilled in the art may understand that, the structure shown in FIG. 13 is merely a block diagram of a partial structure related to a solution in this disclosure, and does not constitute a limitation to the computer device to which the solution in this disclosure is applied. Specifically, the computer device may include more or fewer components than those shown in the figure, or some components may be combined, or a different component deployment may be used.

In an embodiment, a computer device is further provided, including a memory and a processor, the memory storing computer-readable instructions, and the computer-readable instructions, when executed by the processor, implementing the operations in the method embodiments described above.

In an embodiment, a computer-readable storage medium is provided, storing computer-readable instructions, the computer-readable instructions, when executed by a processor, implementing the operations in the method embodiments described above.

In an embodiment, a computer program product is provided, including computer-readable instructions, the computer-readable instructions, when executed by a processor, implementing the operations of the method embodiments described above.

The user information (including, but not limited to, user device information, user personal information, and the like) and data (including, but not limited to, data used for analysis, stored data, presented data, and the like) involved in this disclosure are all information and data authorized by the user or fully authorized by all parties, and the collection, usage, and processing of the relevant data need to comply with relevant laws, regulations, and standards of relevant countries and regions.

A person of ordinary skill in the art may understand that all or some of procedures of the methods in the foregoing embodiments may be implemented by computer-readable instructions instructing relevant hardware. The computer-readable instructions may be stored in a non-volatile computer-readable storage medium. When computer-readable instructions are executed, the procedures of the foregoing method embodiments may be implemented. Any reference to a memory, a database, or other mediums used in the embodiments provided in this disclosure may include at least one of a non-volatile memory and a volatile memory. The non-volatile memory may include a read-only memory (ROM), a magnetic tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, and the like. The volatile memory may include a random access memory (RAM), an external cache memory, or the like. As an illustration rather than a limitation, the RAM may be in various forms, such as a static random access memory (SRAM) or a dynamic random access memory (DRAM). The databases involved in the embodiments provided in this disclosure may include at least one of a relational database and a non-relational database. The non-relational database may include a block-chain-based distributed database, but is not limited thereto. The processors involved in the embodiments provided in this disclosure may be general-purpose processors, central processing units, graphics processing units, digital signal processors, programmable logic devices, or data processing logic devices based on quantum computing, but are not limited thereto.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

Technical features of the foregoing embodiments may be combined in various manners. To make description concise, not all possible combinations of the technical features in the foregoing embodiments are described. However, the combinations of these technical features shall be considered as falling within the scope recorded by this specification provided that no conflict exists.

The foregoing embodiments show only several implementations of this disclosure and are described in detail, which, however, are not to be construed as a limitation to the patent scope of this disclosure. For a person of ordinary skill in the art, several transformations and improvements can be made without departing from the idea of this disclosure. These transformations and improvements fall within the protection scope of this disclosure.

What is claimed is:

1. A feature extraction model processing method, comprising:

obtaining a sample image and an inheritance parameter of the sample image, the inheritance parameter being based on feature distinctiveness of a first image feature of the sample image, and the first image feature being extracted from the sample image by a trained feature extraction model;

obtaining, from a feature extraction model to be trained, a second image feature extracted from the sample image;

obtaining, from a trained image classification model, a classification result of a first classification that is based on the second image feature, the trained image classification model being trained with the trained feature extraction model;

determining a classification loss of the first classification according to the classification result of the first classification;

adjusting the classification loss of the first classification based on the inheritance parameter to obtain a model compatibility loss;

obtaining, from an image classification model to be trained, a second classification result of a second classification based on the second image feature;

determining a classification loss of the second classification according to the classification result of the second classification; and updating, based on the model compatibility loss and the classification loss of the second classification, respective model parameters of the feature extraction model to be trained and the image classification model to be trained.

2. The method according to claim 1, further comprising:

obtaining, from the trained feature extraction model, the first image feature extracted from the sample image;

obtaining, from the trained image classification model, an image category classification result of an image classification performed on the first image feature; and determining the inheritance parameter of the sample image according to the image category classification result.

3. The method according to claim 2, wherein the determining the inheritance parameter comprises:

determining a category cross entropy parameter based on the image category classification result;

normalizing the category cross entropy parameter to obtain a distinctiveness parameter, the distinctiveness parameter indicating the feature distinctiveness of the first image feature; and determining the inheritance parameter of the sample image according to the distinctiveness parameter.

4. The method according to claim 1, wherein the inheritance parameter includes an inheritance weight that has a positive correlation with a metric value of the feature distinctiveness, and the adjusting the classification loss of the first classification includes weighting the classification loss of the first classification according to the inheritance weight to obtain the model compatibility loss.

5. The method according to claim 1, wherein the obtaining the classification result of the first classification comprises:

determining the trained image classification model and a category label of the sample image;

determining, based on the category label, a historical classification model parameter of the trained image classification model for a category to which the sample image belongs; and obtaining, via the trained image classification model, the classification result of the first classification according to the second image feature and the historical classification model parameter.

6. The method according to claim 5, wherein the determining the classification loss of the first classification comprises:

obtaining the classification loss of the first classification based on an angle interval between the second image feature and the historical classification model parameter in the classification result of the first classification.

7. The method according to claim 1, wherein the determining the classification loss of the first classification comprises:

determining the classification loss of the first classification based on a difference between the classification result of the first classification and a category label of the sample image.

8. The method according to claim 1, wherein the obtaining the second classification result includes performing the second classification based on the second image feature via the image classification model to be trained; and the determining the classification loss of the second classification includes determining, via the image classification model to be trained, the classification loss of the second classification based on a difference between the classification result of the second classification and a category label carried by the sample image.

9. The method according to claim 1, wherein the updating comprises:

determining a loss in training according to a sum of the model compatibility loss and the classification loss of the second classification; and updating, based on the loss in the training, the respective model parameters of the feature extraction model to be trained and the image classification model to be trained.

10. The method according to claim 1, further comprising:

performing feature mapping on the first image feature via a feature evolution model to be trained to obtain a mapping feature of the first image feature;

obtaining, from the image classification model to be trained, a third classification result of a third classification based on the mapping feature determining a classification loss of the third classification according to the classification result of the third classification, wherein the updating includes updating, based on the model compatibility loss, the classification loss of the second classification, and the classification loss of the third classification, respective model parameters of the feature extraction model to be trained, the image classification model to be trained, and the feature evolution model to be trained.

11. The method according to claim 10, wherein the updating, based on the model compatibility loss, the classification loss of the second classification, and the classification loss of the third classification, the respective model parameters of the feature extraction model to be trained, the image classification model to be trained, and the feature evolution model to be trained comprises:

obtaining a target loss according to the model compatibility loss, the classification loss of the second classification, and the classification loss of the third classification; and updating, based on the target loss, the respective model parameters of the feature extraction model to be trained, the image classification model to be trained, and the feature evolution model to be trained.

12. The method according to claim 11, wherein the obtaining the target loss comprises:

obtaining the target loss according to a sum of the model compatibility loss, the classification loss of the second classification, and the classification loss of the third classification.

13. The method according to claim 10, further comprising:

determining a to-be-queried-image feature library associated with the trained feature extraction model, the to-be-queried-image feature library including respective to-be-queried-image features of images to be queried, and the to-be-queried-image features being extracted by the trained feature extraction model from the images to be queried;

performing feature mapping on the to-be-queried-image features through a trained feature evolution model to obtain respective to-be-queried-image mapping features of the images to be queried; and updating the to-be-queried-image feature library based on the to-be-queried-image mapping features to obtain a to-be-queried-image feature library associated with the trained feature extraction model.

14. A feature extraction method, comprising:

obtaining an image to be processed; and performing, via a feature extraction model, feature extraction on the image to be processed to obtain a to-be-processed-image feature of the image to be processed, wherein the feature extraction model obtained by updating, based on a model compatibility loss and a classification loss of a second classification, respective model parameters of a feature extraction model to be trained and an image classification model to be trained, the model compatibility loss is obtained by a first classification that is performed based on a second image feature via a trained image classification model and adjustment of a classification loss of the first classification based on an inheritance parameter, the trained image classification model being trained with a trained feature extraction model;

the second image feature is extracted from a sample image via the feature extraction model to be trained;

the inheritance parameter is based on feature distinctiveness of a first image feature of the sample image;

the first image feature is extracted from the sample image by the trained feature extraction model; and the classification loss of the second classification is obtained by the second classification that is performed based on the second image feature via the image classification model to be trained.

15. The method according to claim 14, further comprising:

determining a to-be-queried-image feature library;

matching a feature in the to-be-queried-image feature library to the to-be-processed-image feature to obtain a to-be-queried-image feature matching the to-be-processed-image feature; and determining, according to an image associated with the to-be-queried-image features, an image query result for the image to be processed.

16. A feature extraction model processing apparatus, comprising:

processing circuitry configured to:

obtain a sample image and an inheritance parameter of the sample image, the inheritance parameter being based on feature distinctiveness of a first image feature of the sample image, and the first image feature being extracted from the sample image by a trained feature extraction model;

obtain, from a feature extraction model to be trained, a second image feature extracted from the sample image;

obtain, from a trained image classification model, a classification result of a first classification that is based on the second image feature, the trained image classification model being trained with the trained feature extraction model;

determine a classification loss of the first classification according to the classification result of the first classification;

adjust the classification loss of the first classification based on the inheritance parameter to obtain a model compatibility loss;

obtain, from an image classification model to be trained, a second classification result of a second classification based on the second image feature;

determine a classification loss of the second classification according to the classification result of the second classification; and update, based on the model compatibility loss and the classification loss of the second classification, respective model parameters of the feature extraction model to be trained and the image classification model to be trained.

17. The feature extraction model processing apparatus according to claim 16, wherein the processing circuitry is configured to:

obtain, from the trained feature extraction model, the first image feature extracted from the sample image;

obtain, from the trained image classification model, an image category classification result of an image classification performed on the first image feature; and determine the inheritance parameter of the sample image according to the image category classification result.

18. The feature extraction model processing apparatus according to claim 17, wherein the processing circuitry is configured to:

determine a category cross entropy parameter based on the image category classification result;

normalize the category cross entropy parameter to obtain a distinctiveness parameter, the distinctiveness parameter indicating the feature distinctiveness of the first image feature; and determine the inheritance parameter of the sample image according to the distinctiveness parameter.

19. The feature extraction model processing apparatus according to claim 16, wherein the inheritance parameter includes an inheritance weight that has a positive correlation with a metric value of the feature distinctiveness, and the processing circuitry is configured to weight the classification loss of the first classification according to the inheritance weight to obtain the model compatibility loss.

20. The feature extraction model processing apparatus according to claim 16, wherein the processing circuitry is configured to:

determine the trained image classification model and a category label of the sample image;

determine, based on the category label, a historical classification model parameter of the trained image classification model for a category to which the sample image belongs; and obtain, via the trained image classification model, the classification result of the first classification according to the second image feature and the historical classification model parameter.

* * * * *